United States Patent [19]
Komiya et al.

[11] Patent Number: 5,754,676
[45] Date of Patent: May 19, 1998

[54] IMAGE CLASSIFICATION APPARATUS

[75] Inventors: Yasuhiro Komiya, Hachioji; Tatsuo Nagasaki, Yokohama; Xiaohui Kimura, Matsudo; Toshiaki Wada, Tama; Koichi Ito, Tokyo; Yoshinobu Omata, Hachioji, all of Japan

[73] Assignee: Olympus Optical Co., Ltd., Tokyo, Japan

[21] Appl. No.: 418,183

[22] Filed: Apr. 7, 1995

[30] Foreign Application Priority Data

Apr. 8, 1994 [JP] Japan .................................. 6-070919

[51] Int. Cl.[6] .................................................. G06K 9/62
[52] U.S. Cl. .......................... 382/132; 382/155; 382/170
[58] Field of Search ............................... 382/128, 132, 382/155, 190, 168, 170, 224

[56] References Cited

U.S. PATENT DOCUMENTS

| 5,031,228 | 7/1991 | Lu | 382/227 |
|---|---|---|---|
| 5,239,594 | 8/1993 | Yoda | 382/224 |
| 5,319,549 | 6/1994 | Katsuragawa et al. | 382/132 |
| 5,343,390 | 8/1994 | Doi et al. | 382/132 |
| 5,465,308 | 11/1995 | Hutcheson et al. | 382/190 |
| 5,497,430 | 3/1996 | Sadovnik et al. | 382/190 |

OTHER PUBLICATIONS

Image Labo, Feb. 1993, pp. 19–24, Japan. No translation or author given.
Konica Technical Report, vol. 6, 1993, pp. 55–57, Konica Corp., Japan. Hitoshi et al.
Image Analysis Handbook, pp. 656–658, Miki Takagi e al, Jan., 1993, Japan.

Primary Examiner—Leo Boudreau
Assistant Examiner—Chris Kelley
Attorney, Agent, or Firm—Frishauf, Holtz, Goodman, Langer & Chick

[57] ABSTRACT

An image classification apparatus includes an image input device for inputting image data. A filing device stores the input image data and performs a read, retrieval, or edit operation on the data in accordance with a predetermined instruction. A normalizing unit corrects variations in various image input conditions or variations in image input devices to make the input conditions in execution agree with those in learning. A feature extracting unit extracts a feature amount effective for classification. A classification determination unit performs a classification determination operation on the basis of the feature amount obtained by the feature extracting unit. A display unit synthesizes a result of the classification determination operation with the input image, and displays the synthesized result. A learning control unit controls the feature extracting unit and the classification determination unit on the basis of the predetermined learning data. Accordingly, the classification apparatus classifies a portion of the input image which is difficult to extract by binarization or three-dimensional display alone, and displays the classified portion in an easily recognizable visual form.

20 Claims, 26 Drawing Sheets

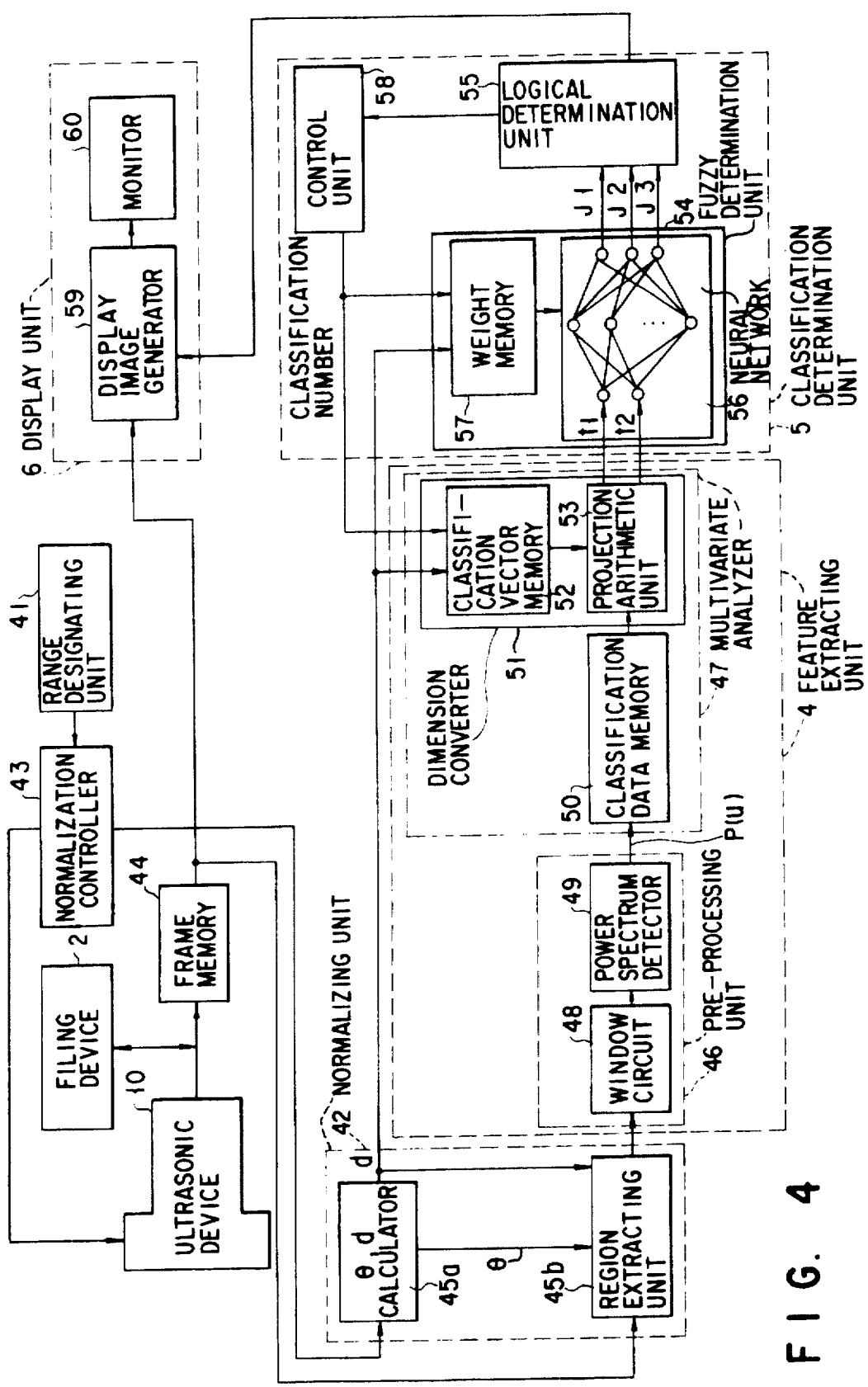
F I G. 4

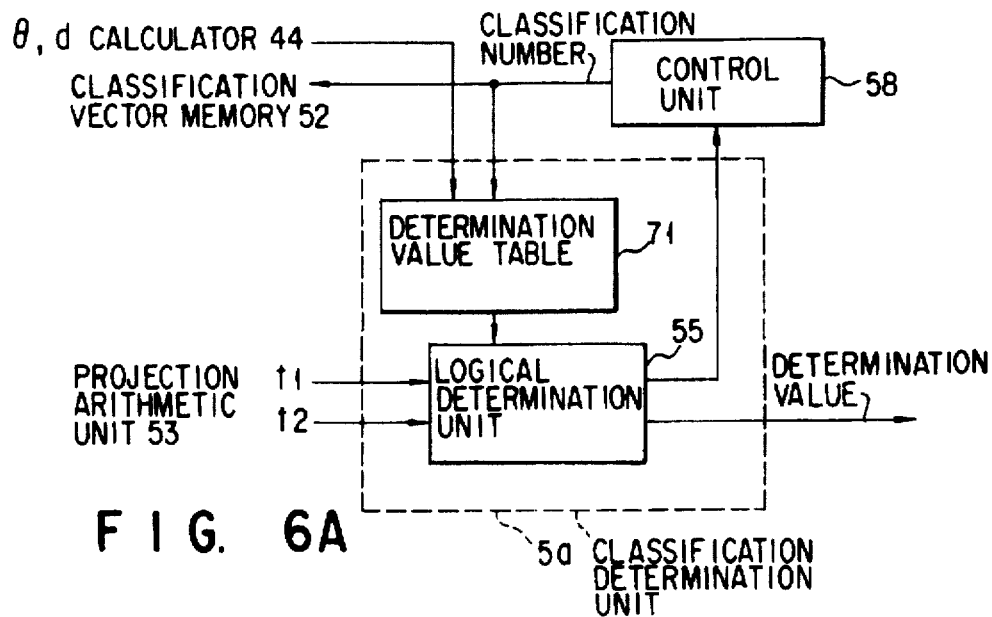
F I G. 6A
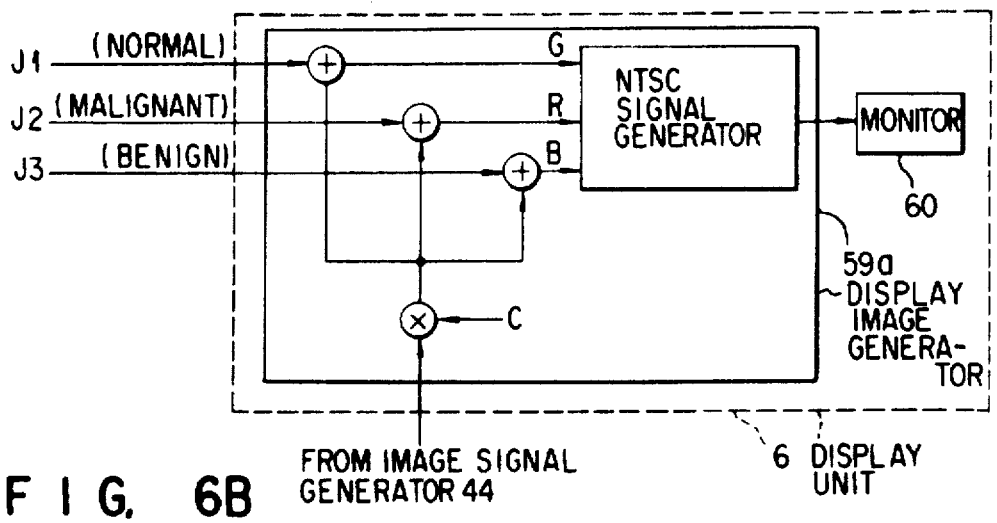
F I G. 6B
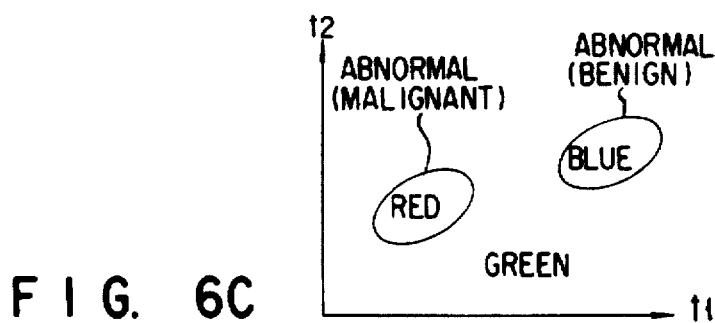
F I G. 6C

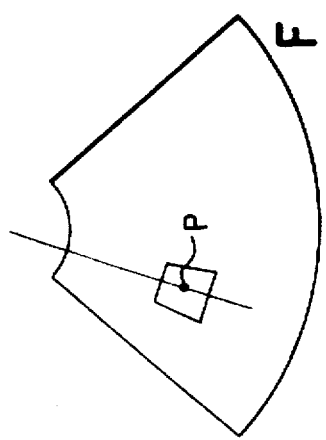
FIG. 9A
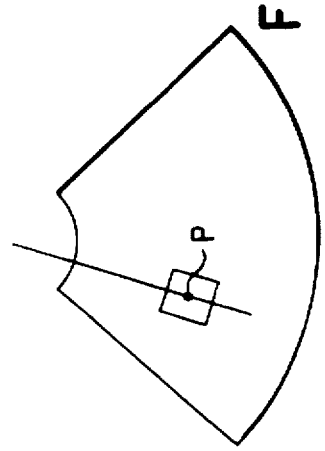
FIG. 9B
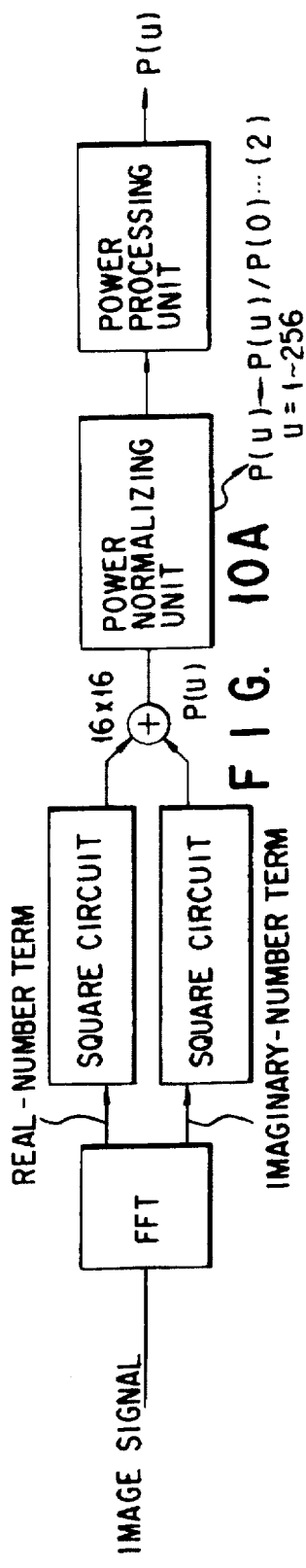
FIG. 10A
FIG. 10B
FIG. 10C
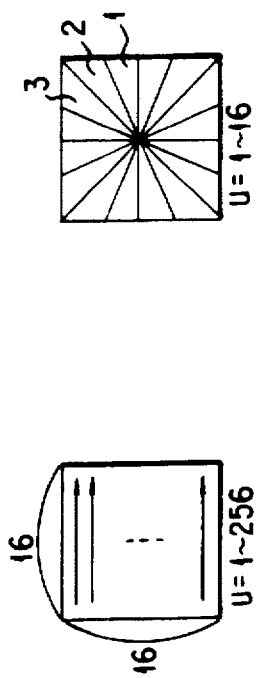
FIG. 10D
FIG. 10E

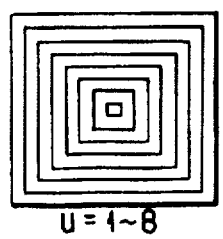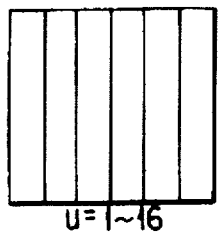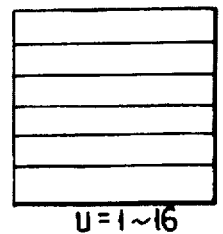
F I G. 10F     F I G. 10G     F I G. 10H
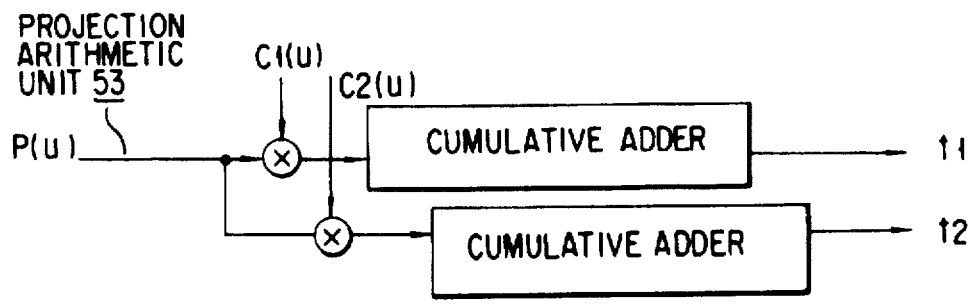
F I G. 11
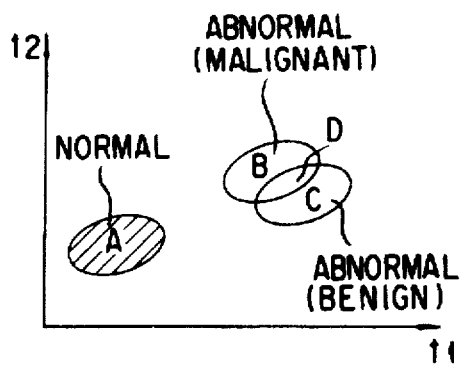     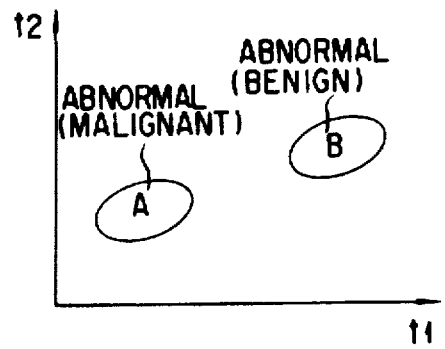
F I G. 12A     F I G. 12B

MALIGNANT TUMOR

BENIGN TUMOR

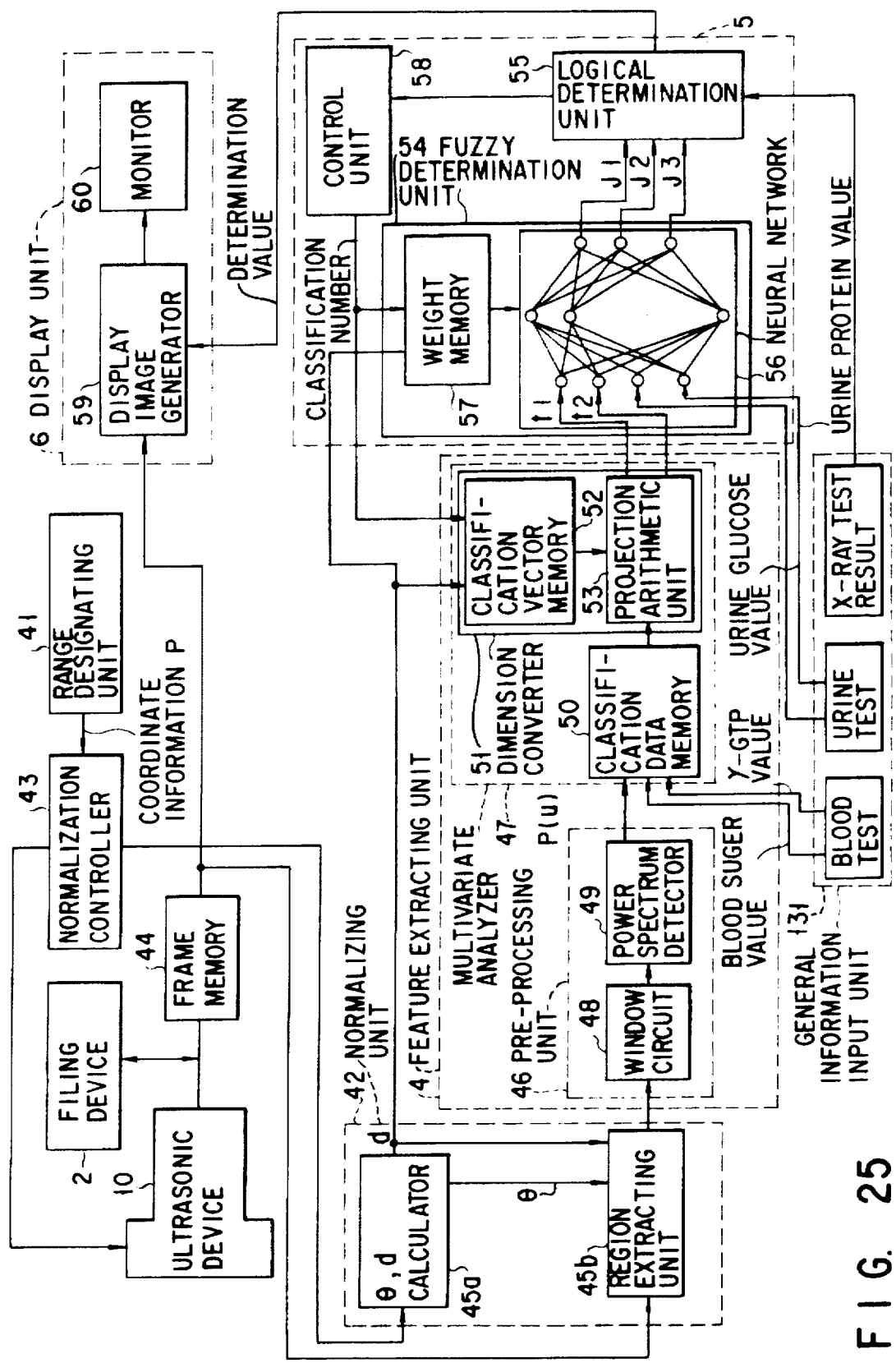
F I G. 25

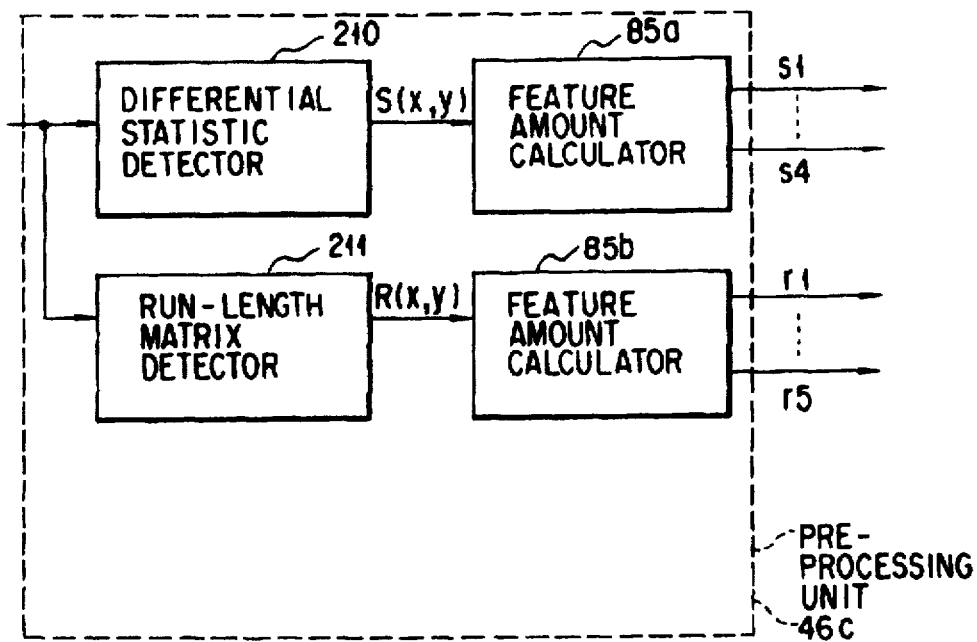
F I G. 31
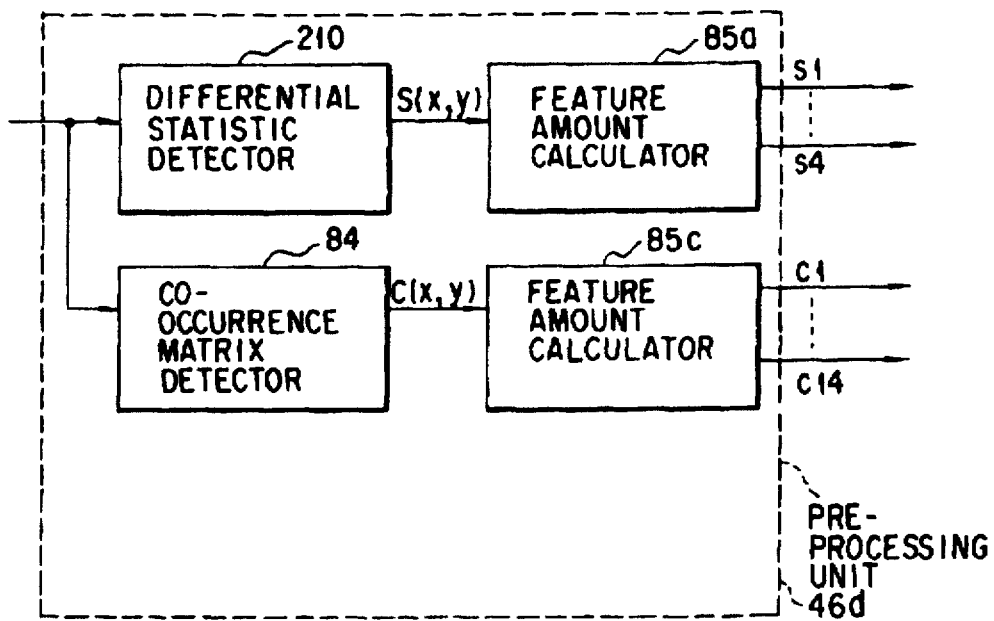
F I G. 32

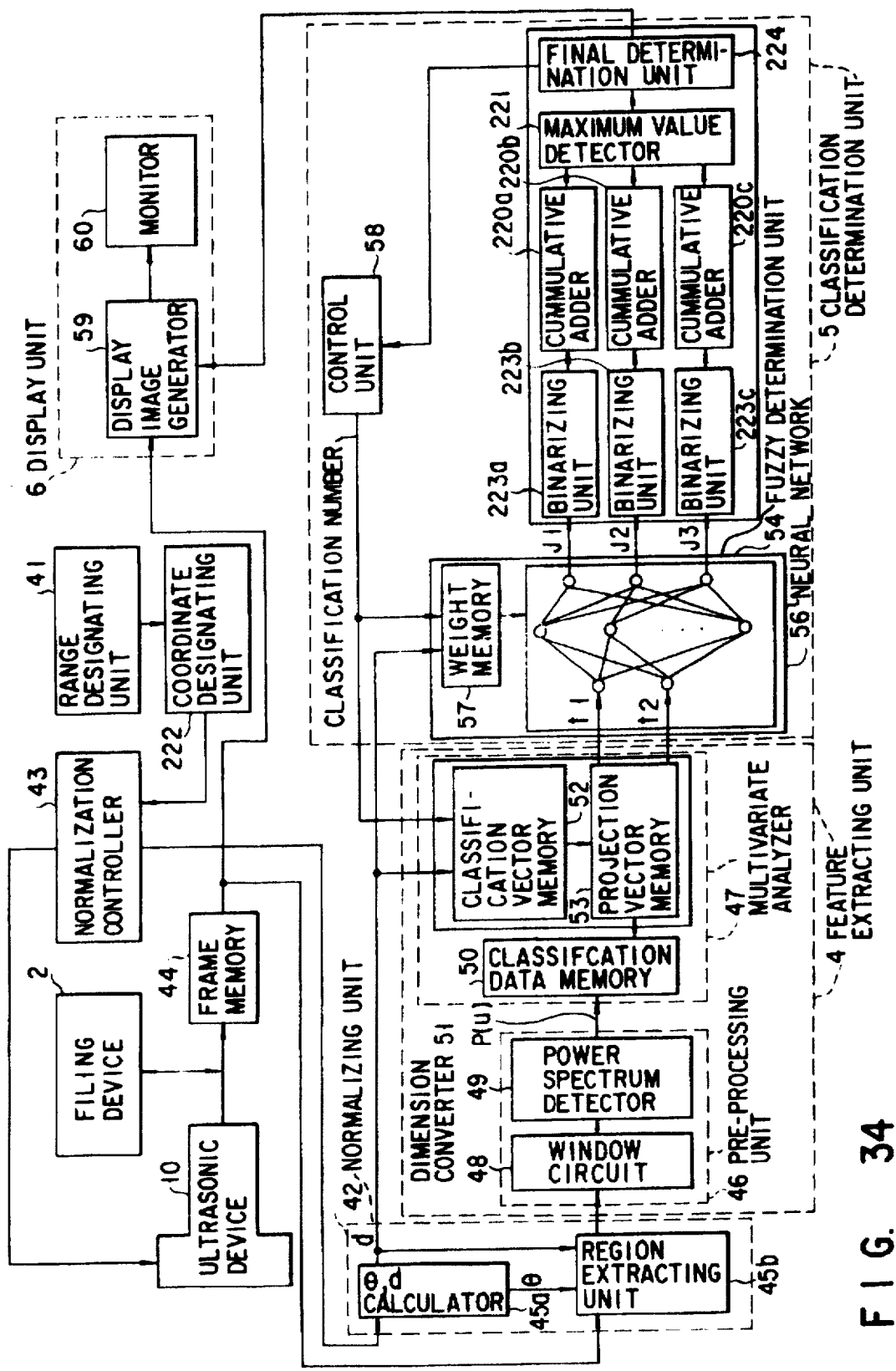
F I G. 34

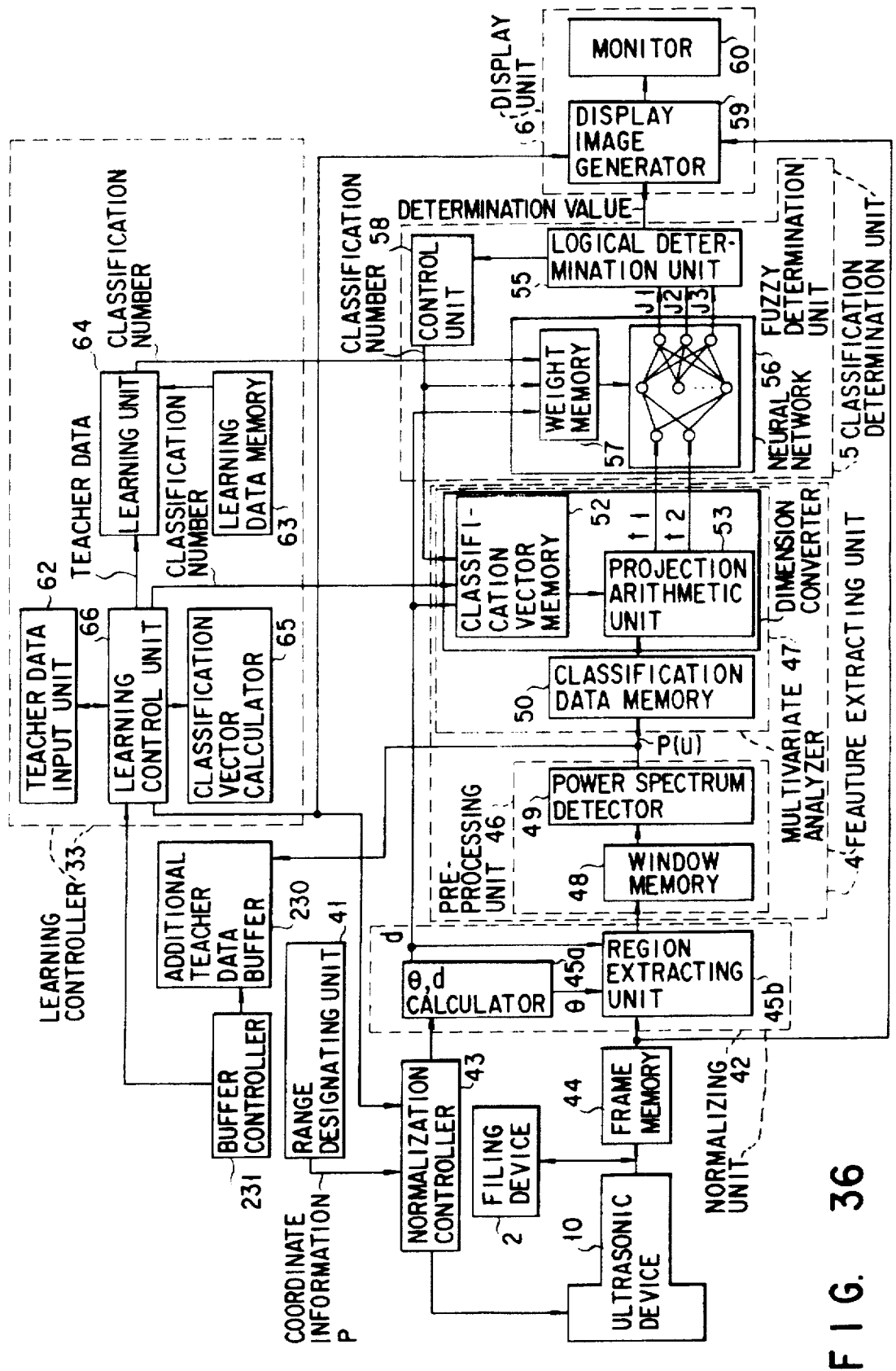
F I G. 36

| CLASSIFICATION NUMBER | |
|---|---|
| 1 | NORMAL - α |
| 2 | NORMAL - β |
| 3 | NORMAL - γ |
| 4 | NORMAL - δ |
| 5 | α - β |
| 6 | α - γ |
| 7 | α - δ |
| 8 | β - γ |
| 9 | β - δ |
| 10 | γ - δ |

F I G. 37A

| | NORMAL | α | β | γ | δ | NUMBER OF CLASSIFICATION TIMES |
|---|---|---|---|---|---|---|
| NORMAL | | ○ | ○ | ○ | ○ | 4 |
| α | × | | × | × | ○ | 1 |
| β | × | ○ | | ○ | × | 2 |
| γ | × | ○ | × | | ○ | 2 |
| δ | × | × | ○ | × | | 1 |

F I G. 37B

IMAGE CLASSIFICATION APPARATUS

BACKGROUND OF THE INVENTION

1. Field of the Invention

The present invention relates to an apparatus for classifying input image information into predetermined types.

2. Description of the Related Art

Generally, image input apparatuses are available which classify images obtained by a photographing apparatus such as a camera or an infrared camera, endoscopic images, microscopic images, or images obtained by an ultrasonic input apparatus, an X-ray image input apparatus, an MRI (Magnetic Resonance Imaging) apparatus, and a CT (Computer Tomography) apparatus, into several predetermined types, and which display the classified images.

A first example is a system described in "Image Labo" (February 1993, p. 19), in which an image input apparatus of the above sort is applied to an apparatus for extracting a malignant tumor by binarization. This "Image Labo" publication also discloses an apparatus which determines primary hepatoma from the irregularity in a three-dimensional image of a morbid portion.

A second example is an apparatus described in "Konica Technical Report", Vol. 6, 1993, p. 55, which performs feature analysis for the difference between an emphasized image of a specific pattern of a morbid portion and a deemphasized image of that pattern.

Unfortunately, in the apparatus for extracting a malignant tumor from a binarized image according to the first example, it is difficult to set the binarization level for detecting malignancy. Consequently, this apparatus is originally effective only for a tumor which is visually distinguishable.

In the second example, the shape of a morbid portion in an image is limited. However, morbid portions actually take various shapes. Since this determines detectable patterns, the detection accuracy decreases with even a slight difference between patterns.

SUMMARY OF THE INVENTION

It is therefore an object of the present invention to provide an image classification apparatus capable of properly classifying portions of input images, which are difficult to extract by binarization or three-dimensional display alone, and displaying these portions in a visually readily recognizable form.

That is, the present invention provides image classification apparatuses having the following arrangements.

According to the first aspect of the present invention, there is provided an image classification apparatus comprising information input means for inputting information to be classified, feature extracting means for extracting feature information from the input information from the information input means, and classification determining means for determining the type of information on the basis of the feature information extracted by the feature extracting means and/or the input information from the information input means and classifying the information in accordance with the determined type.

According to the second aspect of the present invention, there is provided an image classification apparatus comprising information input means for inputting information to be classified, normalizing means for normalizing the input information from the information input means, feature extracting means for extracting feature information from the information normalized by the normalizing means, and classification determining means for determining the type of information on the basis of the feature information extracted by the feature extracting means and/or the input information from the information input means and classifying the information in accordance with the determined type.

According to the third aspect of the present invention, there is provided an image classification apparatus comprising information input means for inputting information to be classified, feature extracting means for extracting feature information from the input information from the information input means, classification determining means for determining the type of information on the basis of the feature information extracted by the feature extracting means and/or the input information from the information input means and classifying the information in accordance with the determined type, and display means for displaying the classification determination result obtained by the classification determining means.

According to the fourth aspect of the present invention, there is provided an image classification apparatus comprising information input means for inputting information to be classified, feature extracting means for extracting feature information from the input information from the information input means, classification determining means for determining the type of information on the basis of the feature information extracted by the feature extracting means and/or the input information from the information input means and classifying the information in accordance with the determined type, and learning means for constructing the feature extracting means and/or the classification determining means.

According to the fifth aspect of the present invention, there is provided an image classification apparatus comprising information input means for inputting information to be classified, normalizing means for normalizing the input information from the information input means, feature extracting means for extracting feature information from the information normalized by the normalizing means, classification determining means for determining the type of information on the basis of the feature information extracted by the feature extracting means and/or the input information from the information input means and classifying the information in accordance with the determined type, and display means for displaying the classification determination result obtained by the classification determining means.

According to the sixth aspect of the present invention, there is provided an image classification apparatus comprising information input means for inputting information to be classified, normalizing means for normalizing the input information from the information input means, feature extracting means for extracting feature information from the information normalized by the normalizing means, classification determining means for determining the type of information on the basis of the feature information extracted by the feature extracting means and/or the input information from the information input means and classifying the information in accordance with the determined type, and learning means for constructing the feature extracting means and/or the classification determining means.

According to the seventh aspect of the present invention, there is provided an image classification apparatus comprising information input means for inputting information to be classified, feature extracting means for extracting feature information from the input information from the information input means, classification determining means for determining the type of information on the basis of the feature information extracted by the feature extracting means and/or the input information from the information input means and classifying the information in accordance with the determined type, display means for displaying the classification determination result obtained by the classification determining means, and learning means for constructing the feature extracting means and/or the classification determining means.

According to the eighth aspect of the present invention, there is provided an image classification apparatus comprising information input means for inputting information to be classified, normalizing means for normalizing the input information from the information input means, feature extracting means for extracting feature information from the information normalized by the normalizing means, classification determining means for determining the type of information on the basis of the feature information extracted by the feature extracting means and/or the input information from the information input means and classifying the information in accordance with the determined type, display means for displaying the classification determination result obtained by the classification determining means, and learning means for constructing the feature extracting means and/or the classification determining means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a block diagram showing a practical example of the arrangement (for execution of classification determination) of the image classification apparatus of the first embodiment which incorporates the convex ultrasonic device shown in FIGS. 2 and 3;

FIG. 6A is a block diagram showing the arrangement of a classification determination unit of the image classification apparatus according to the second embodiment, FIG. 6B is a block diagram showing the arrangement of a display unit of the image classification apparatus according to the third embodiment, and FIG. 6C is a view showing an example of a display of abnormal portions on the display unit of the image classification apparatus;

FIGS. 9A and 9B are views showing the shapes of extracted regions of ultrasonic images;

FIGS. 10A to 10H are views showing a practical example of the arrangement of a power spectrum detector for detecting a power spectrum P(u) and a classification method;

FIG. 11 is a block diagram showing a practical example of the arrangement of a projection arithmetic unit;

FIGS. 12A and 12B are views showing examples of the positions of normal and abnormal regions according to results t1 and t2 from the projection arithmetic unit;

FIG. 25 is a block diagram showing the arrangement of an image classification apparatus according to the tenth embodiment;

FIG. 31 is a block diagram showing an example of the arrangement of a pre-processing unit of a feature extracting unit in an image classification apparatus according to the 13th embodiment;

FIG. 32 is a block diagram showing an example of the arrangement of a modification of the pre-processing unit of the feature extracting unit in the 13th embodiment;

FIG. 34 is a block diagram showing the arrangement of the image classification apparatus according to the 14th embodiment;

FIG. 36 is a block diagram showing the arrangement of an image classification apparatus according to the 16th embodiment; and FIG. 37A is a view for explaining classification numbers in the 16th embodiment, and FIG. 37B is a view showing the result of classification performed by choosing two out of five objects.

DETAILED DESCRIPTION OF THE PREFERRED EMBODIMENTS

Embodiments of the present invention will be described in detail below with reference to the accompanying drawings.

First, an image classification apparatus of the present invention which supports diagnosis of a morbid portion of a tumor which is difficult to visually locate will be described below.

The characteristic feature of this image classification apparatus is that the texture pattern of a morbid portion is analyzed by learning using a statistical method to thereby extract a feature amount which is effective in classification.

If image input conditions are different, different images are obtained even from the same morbid portion. Therefore, this image classification apparatus includes a form in which variations in image input conditions or in image input devices are corrected (normalized).

Especially when an input image is an ultrasonic image, this normalization involves extraction of a determination region according to the frequency, the waveform, the TGC (Time Gain Control), the DR (Dynamic Range), the gain, or the pixel position.

Also, the feature of a morbid portion is difficult to obtain by simple binarization or three-dimensional display alone. Therefore, this image classification apparatus includes a modification in which multivariate analysis is performed for a number of feature amounts to thereby select a feature amount or a processing method effective in determination of a morbid portion. For this purpose, the apparatus has a form including two modes, i.e., a learning mode and an execution mode.

In the learning mode, an experienced medical doctor or the like person designates a normal portion and a morbid portion on an image and forms learning data. Various types of pre-processing are performed for this learning data, and the statistic is subjected to multivariate analysis. Consequently, a feature amount effective in determination of the morbid portion is extracted.

In the execution mode, the morbid portion is determined by extracting the feature amount which is determined in the learning mode. If necessary, the data is fed back to a feature extracting unit or a classification determination unit in accordance with the determination result, thereby increasing the accuracy of the determination. In both of the learning and execution modes, the normalization discussed above can be performed.

The apparatus also includes a modification in which the determination result is synthesized with an original image before being displayed. For example, although an original image is monochromatic in the case of an ultrasonic image or an X-ray image, a region found to be a morbid portion is displayed in a certain color.

Figure 1A:
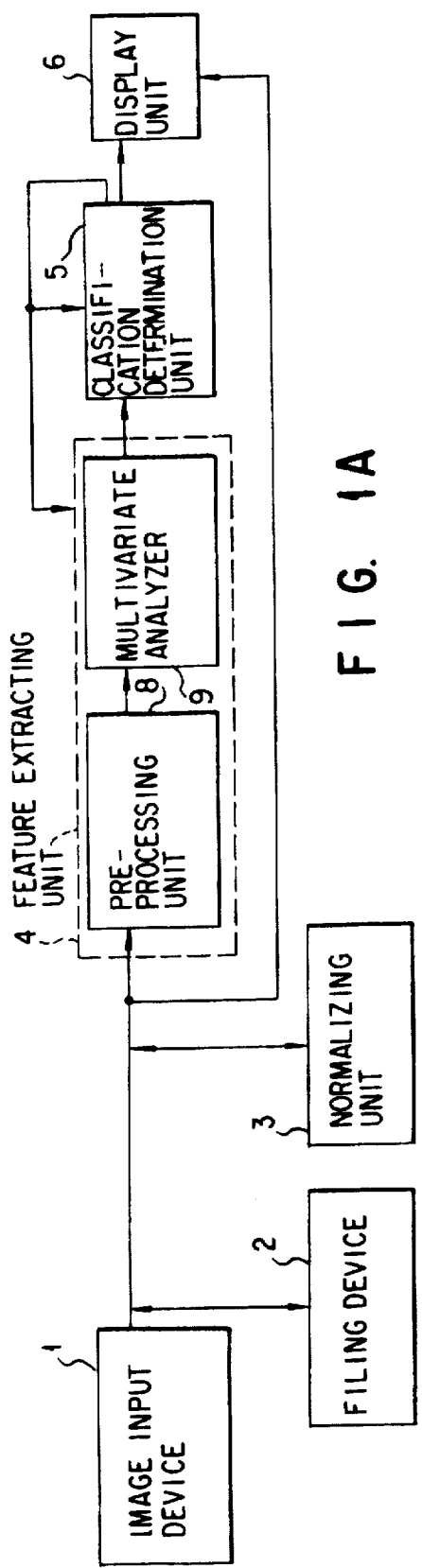
FIG. 1A is a block diagram showing the arrangement for classification execution of an image classification apparatus according to the present invention.
Figure 1B:
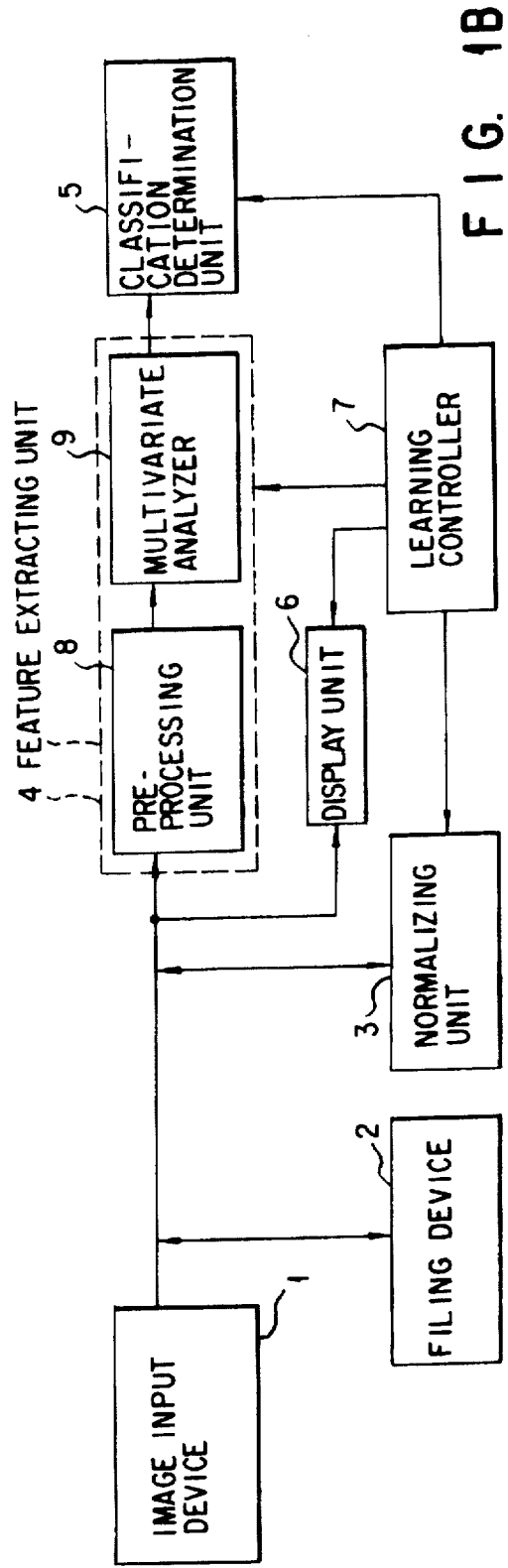
FIG. 1B is a block diagram showing the arrangement for classification learning performed prior to executing classification.

FIGS. 1A and 1B illustrate one example of the image classification apparatus of the present invention. FIG. 1A shows an arrangement for classification execution in the image classification apparatus. FIG. 1B shows an arrangement for classification learning performed prior to executing classification.

The arrangement of the image classification apparatus in FIG. 1A comprises an image input device 1 such as an ultrasonic image input device or an X-ray image input device, a filing device 2, a normalizing unit 3, a feature extracting unit 4, a classification determination unit 5, and a display unit 6. The image input device 1 inputs image data or CT image data. The filing device 2 stores the input image data from the image input device 1 and reads out, retrieves, or edits the data in accordance with a predetermined operation. The normalizing unit 3 performs normalization for making the input conditions in execution agree with the input conditions in learning by correcting variations in the image input conditions or in the image input devices. The feature extracting unit 4 extracts a feature amount effective in classification. The classification determination unit 5 performs classification determination (to be described later) on the basis of the feature amount obtained by the feature extracting unit 4. The display unit 6 displays the result of synthesis of the input image and the classification determination result. The arrangement in FIG. 1B further comprises, in addition to the above components, a learning controller 7 which controls the feature extracting unit 4 and the classification determination unit 5 on the basis of predetermined learning data.

The feature extracting unit 4 includes a pre-processing unit 8 and a multivariate analyzer 9. The pre-processing unit 8 extracts, as the pre-stage, a feature amount, e.g., a primary statistic, which is effective in diagnosis, from an input image. The multivariate analyzer 9 analyzes the feature amount obtained by the pre-processing unit 8 and converts or decreases (the number of dimensions of) the feature amount.

In the image classification apparatus with the above arrangements, input image data from the image input device 1 is subjected to learning or classification determination after, if necessary, being stored in the filing device 2. The normalizing unit 3 improves the accuracy of classification determination in executing the determination.

The pre-processing unit 8 extracts a plurality of feature amounts that are effective in diagnosis from the input image data previously subjected to the predetermined processing in the filing device 2 and the normalizing unit 3. The multivariate analyzer 9 selects a feature amount effective in classification from these feature amounts, thereby further improving the classification accuracy. Also, the classification determination can be performed at a high speed since the number of dimensions is decreased. Additionally, the combination of the pre-processing unit 8 and the multivariate analyzer 9 makes it possible to choose an optimum classification feature amount in accordance with an object to be classified.

The feature extracting unit 4 with the above arrangement extracts a feature amount by which image data is automatically classified. The classification determination unit 5 performs determination on the basis of this feature amount. The classification determination result obtained in this way is displayed in a visually readily understandable form on the display unit 6.

The learning controller 7 incorporates classification determination data, which is found to be highly reliable by experiments, into the normalizing unit 3, the feature extracting unit 4, and the classification determination unit 5. This allows even an inexperienced operator to perform high-level classification determinations.

In the image classification apparatus with the above arrangement, if neither of the execution mode, FIG. 1A, nor the learning mode, FIG. 1B, is selected, an input image from the image input device 1 is displayed intact on the display unit 6.

The execution mode will be described below with reference to FIG. 1A.

First, the image input device 1 inputs an image which is normalized in, e.g., the DR, the gain, and the magnification. A control unit (not shown) sequentially supplies coordinate information, and normalization is performed for, e.g., the extracting direction of a region corresponding to the coordinate information. The feature extracting unit 4 performs pre-processing and multivariate analysis, thereby performing classification determination. Feedback calculations are performed where necessary, and the result is synthesized with the original image and displayed on the display unit 6. The control unit sequentially supplies coordinate information within a designated range, and the series of the above processing is executed. The designated range is, e.g., displayed in a certain color.

Figure 2:
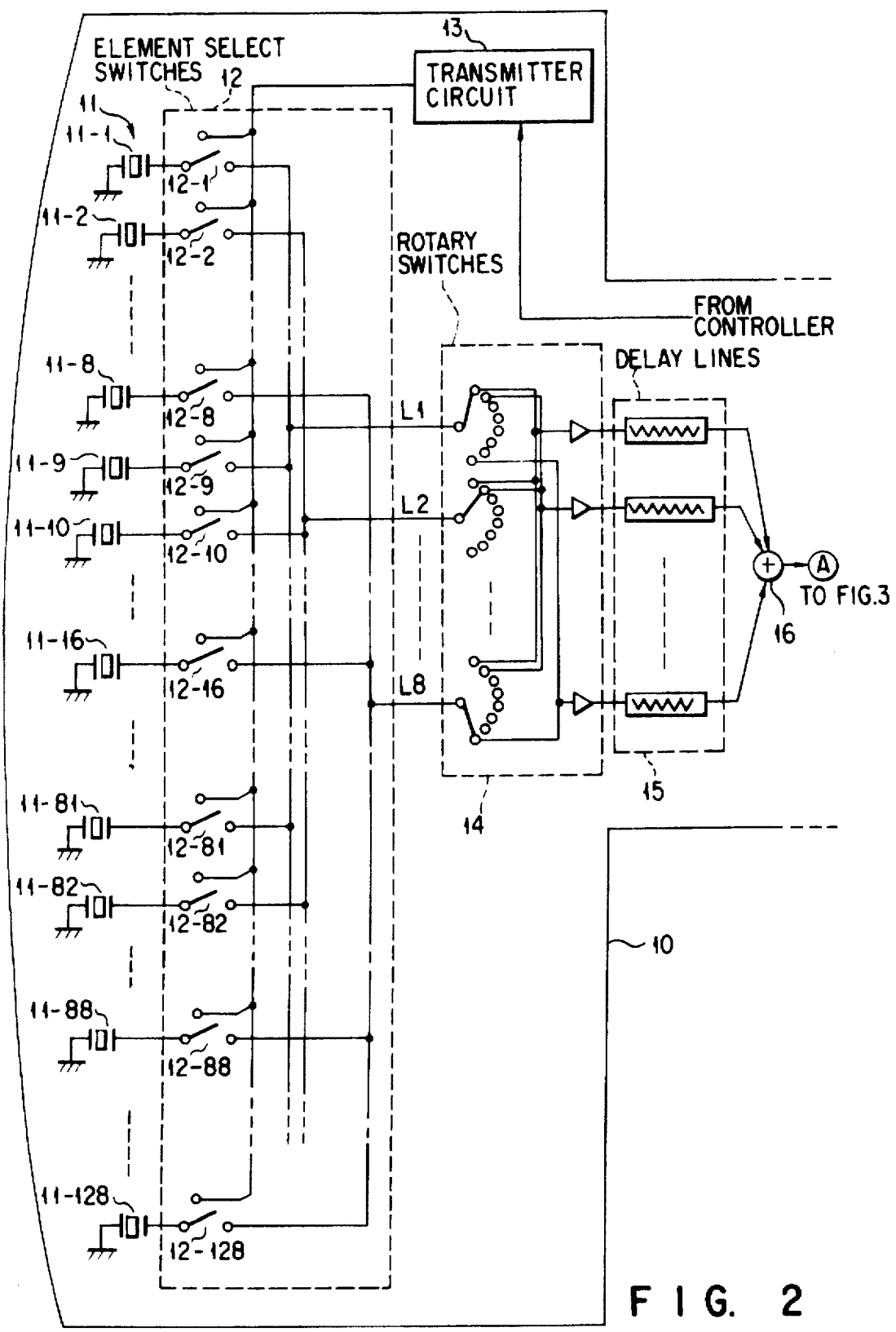
FIG. 2 is a block diagram showing the first-half arrangement of a convex ultrasonic device which is used as an image input device of an image classification apparatus according to the first embodiment.
Figure 3:
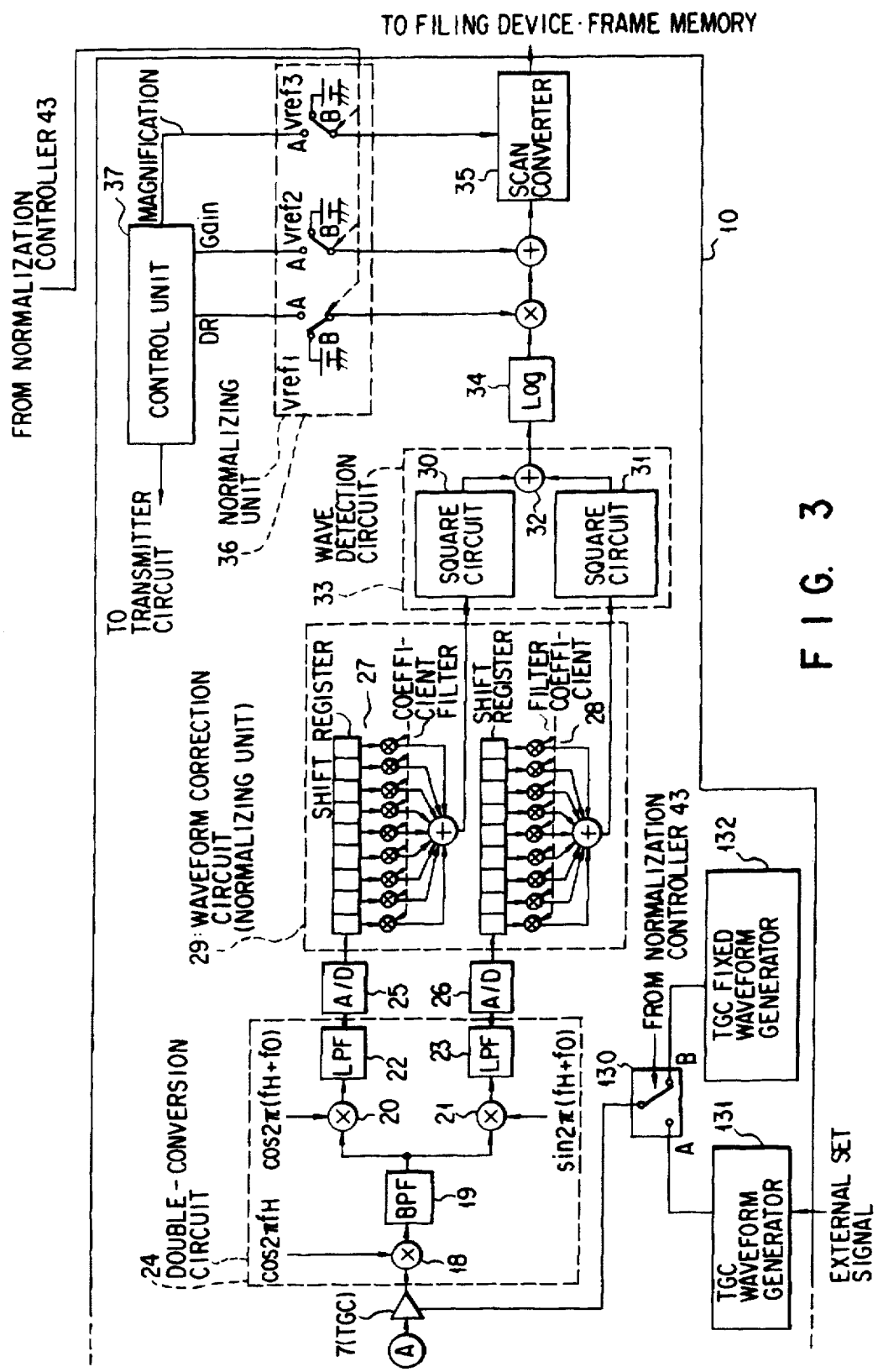
FIG. 3 is a block diagram showing the last-half arrangement of the convex ultrasonic device used as the image input device of the image classification apparatus according to the first embodiment.

FIGS. 2 and 3 illustrate a convex ultrasonic device used as an image input device of an image classification apparatus according to the first embodiment of the present invention.

This convex ultrasonic device 10 comprises 128 oscillators 11, element select switches 12, a transmitter circuit 13, rotary switches 14, delay lines 15, an adder 16, and an amplifier 17. The oscillators 11 selectively transmit and receive ultrasonic waves. The element select switches 12 perform switching between transmission and reception of the oscillators 11, thereby turning on or off the oscillators in units of predetermined numbers (this predetermined number is called an aperture and 8 in this embodiment). The transmitter circuit 13 is connected to one of the switch terminals of each switch 12. The transmitter circuit 13 transmits pulses by which a waveform converged into a predetermined focus point is formed from 8 oscillators. Each of the rotary switches 14 is connected to the other switch terminal of each element select switch 12. Each rotary switch 14 transfers 8 received signals to their respective corresponding ones of the delay lines 15. Since the received wave is a spherical wave, the signal reception timing varies in accordance with the position of an oscillator. The delay lines 15 correct the time differences between these received signals. The adder 16 adds the output signals from the delay lines 15. In this embodiment, the amplifier 17 is called TGC (Time Gain Control) because the distance is in agreement with time. The amplifier 17 amplifies the amplitude which has decayed according to the distance.

By the function of a switch 130 which is switched by a normalization controller 43 (to be described later), the TGC is connected to a TGC fixed waveform generator 132 for performing predetermined amplification or to a TGC waveform generator 131 which performs amplification on the basis of an external set signal. In the learning or execution mode, the TGC is connected to the TGC fixed waveform generator 132 and normalized to a predetermined amplification factor.

The convex ultrasonic device 10 further comprises a double-conversion circuit 24, A/D converters 25 and 26, a waveform correction circuit (normalizing unit) 29, and a wave detection circuit 33. The double-conversion circuit 24 consists of a multiplier 18 for temporarily shifting the output signal (the signal received by each oscillator 11) from the amplifier 17 to a high frequency ($f_0+f_H$), a BPF 19 for extracting a signal of a predetermined band, multipliers 20 and 21 for shifting to the zero frequency, and LPFs 22 and 23. The A/D converters 25 and 26 A/D-convert the output signals from the LPFs 22 and 23, respectively. The waveform correction circuit 29 consists of two digital filters 27 and 28 each of which corrects the waveform of an ultrasonic wave, FIG. 7A, which is the waveform of the A/D-converted output signal, into the waveform shown in FIG. 7C. The wave detection circuit 33 includes square circuits 30 and 31 for calculating output values from the outputs of the digital filters 27 and 28, and an adder 32. The convex ultrasonic device 10 also comprises a logarithm amplifier 34, a scan converter 35, a normalizing unit 36, and a control unit 37. The logarithm amplifier 34 compresses the dynamic range of the detection output from the wave detection circuit 33. The scan converter 35 performs scanning line conversion corresponding an image display unit (not shown) and is also capable of controlling the display magnification of the display unit. The normalizing unit 36 sets the DR (Dynamic Range), the gain (Gain), and the magnification to predetermined values Vref1, Vref2, and Vref3, respectively, in the learning or execution mode. The control unit 37 controls the transmitter circuit 13 and also sets the DR, the gain, and the magnification to their respective values desired by a user.

Figure 7:
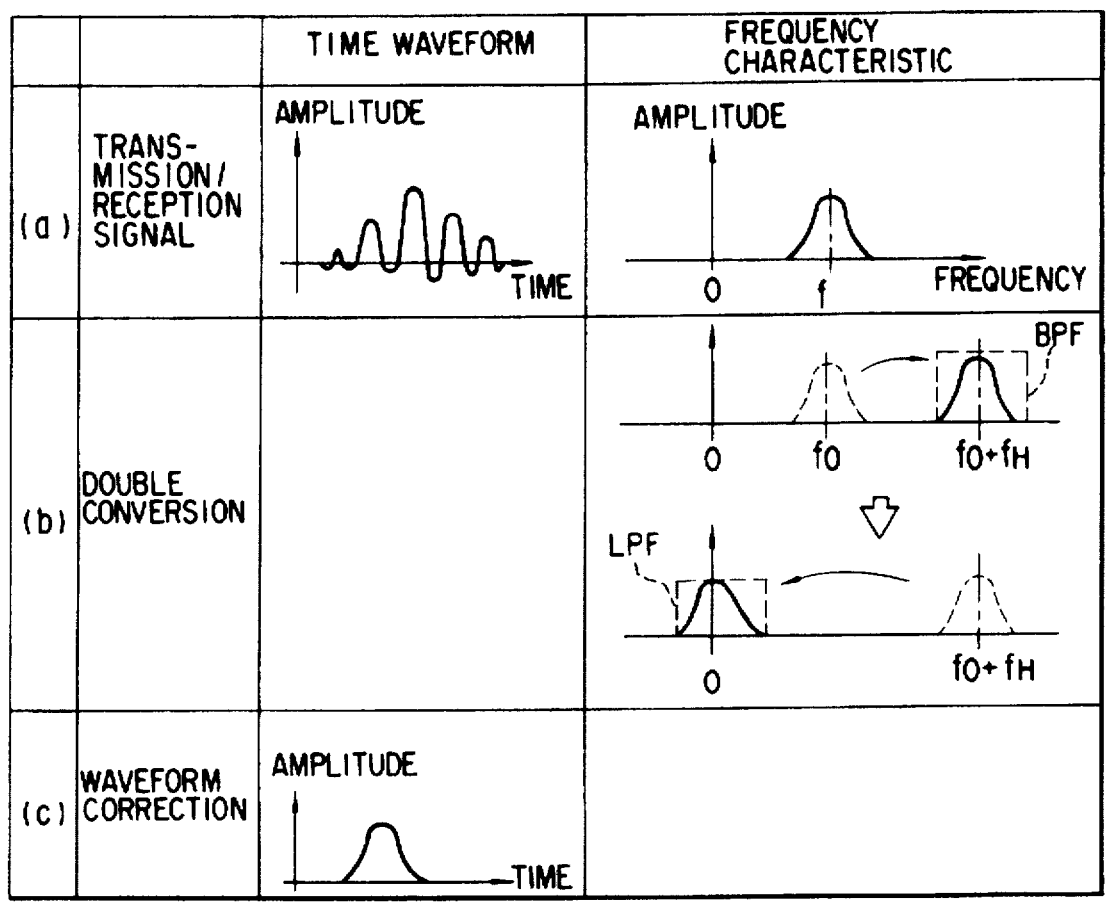
FIG. 7 is a view for explaining waveform correction for ultrasonic waves.

The convex ultrasonic device with the above arrangement is applied with transmission/reception signals having the waveform as shown in FIG. 7A, assuming that the frequency of the oscillators 11 is $f_0$.

These signals are selected by switching the element select switches 12 and the rotary switches 14, and the timings of the signals are corrected to be equal through the delay lines 15. The corrected signals are once shifted to a high frequency ($f_0+f_H$), FIG. 7B, by the double-conversion circuit 24, in order to efficiently extract only the signal band, and then shifted to a low frequency. The load on the circuit is reduced by this processing.

In addition, if learned oscillators are different in characteristics, the waveform correction circuit (normalizing unit) 29 performs correction by using the filters. The correction is also performed when the learned oscillators have aged. It is also possible to correct frequency decay with respect to the distance (time).

The two output signals from the waveform correction circuit 29 are subjected to predetermined wave detection done by the wave detection circuit 33. The normalizing unit 36 normalizes the detection signal only in the learning mode and the execution mode. That is, the DR, the gain, and the magnification are normalized to their respective predetermined values in the learning and execution modes. Furthermore, the scan converter 35 performs scanning line conversion corresponding to the display unit (not shown) and also controls the display magnification of the display unit.

FIG. 4 shows the arrangement of the image classification apparatus according to the first embodiment which incorporates the convex ultrasonic device discussed above. The arrangement of the image classification apparatus in FIG. 4 is for executing classification determination (execution mode). The same reference numerals as in FIG. 1 denote the same parts in FIG. 4, and a detailed description thereof will be omitted. In this embodiment, the image classification apparatus classifies pathological forms in a human body, such as tumors, in the form of images.

This image classification apparatus generally comprises a convex ultrasonic device 10, a range designating unit 41, a normalization controller 43, a frame memory 44, a filing device 2, a feature extracting unit 4, a classification determination unit 5, and a display unit 6. The range designating unit 41 designates, from an image, the range in which classification determination is to be performed and the size of an extraction region for use in classification determination, and sequentially outputs coordinate information. The normalization controller 43 controls the normalizing units 29 and 36 and the switch 130 of the ultrasonic device 10 and also controls a normalizing unit 42, thereby performing switching between normal diagnosis and determination classification processing (in the learning mode or the execution mode). The frame memory 44 temporarily stores an image signal from the ultrasonic device 10 in units of frames.

Note that, for example, the predetermined values Vref1, Vref2, and Vref3 of the normalizing unit 36 and the amplification factor of the TGC fixed waveform generator 132 are set to their respective desired values by condition setting means (not shown).

The normalizing unit 42 consists of a θ,d calculator 45a and a region extracting unit 45b. The θ,d calculator 45a calculates an inclination angle θ at the position of a designated coordinate value P and a distance d to that position from Equation (1) below. [Eq. 1]

$$\begin{cases} \theta = \tan^{-1} \frac{Cx - x}{|Cy - y|} \\ d = \sqrt{(cx-x)^2 + (cy-qy)^2} - r \end{cases}$$

$$\left( \begin{array}{c} r = \sqrt{(cx-q1x)^2 + (cy-q1y)^2} \\ Q1 = (q1x, q1y) \end{array} \right)$$

As a result, the values of θ and d are simply calculated from the coordinates of four points in the peripheral portion of a convex image. The region extracting unit 45b deforms an extraction region in accordance with θ and d from the θ,d calculator 45a. That is, the region extracting unit 45b rotates a rectangle (FIG. 9A) or extracts a trapezoid (FIG. 9B), thereby correcting the difference in the characteristics between convex ultrasonic images whose imaging characteristics (frequency characteristics) are different at different image positions.

The range designating unit 41 allows a user to easily designate an area in an image which he or she wishes to classify. The range designating unit 41 designates the range of classification determination, the size of an extraction region for use in classification determination, and coordinate information.

The feature extracting unit 4 includes a pre-processing unit 46 and a multivariate analyzer 47. The pre-processing unit 46 consists of a window circuit 48 and a power spectrum detector 49. In detecting a power spectrum P(u) having a number of pieces of information effective in classification of an image (to be described below), the window circuit 48 removes the influence of edges of the peripheral portion of an image by multiplying by a window function such as a Hamming or Hanning function. The power spectrum detector 49 detects the power spectrum P(u) using a Fourier transform as shown in FIG. 10A. In FIG. 10A, FFT means a fast Fourier transform in which output real-number and imaginary-number terms are squared and added. A power normalizing unit performs processing such that the zero frequency is set at a fixed value, thereby normalizing the difference between image luminances. A power processing unit converts the values as illustrated in FIGS. 10B to 10E.

The multivariate analyzer 47 consists of a classification data memory 50 and a dimension converter 51. The classification data memory 50 stores the power spectrum P(u) detected by the power spectrum detector 49 and is therefore used many times in feedback control. The dimension converter 51 is constituted by a classification vector memory 52 and a projection arithmetic unit 53. The classification vector memory 52 stores classification vectors calculated during learning. The values of the stored classification vectors are chosen in accordance with the value of d calculated by the θ,d calculator 45a and with the classification number. The projection arithmetic unit 53 calculates the inner products of the power spectrum P(u) read out from the classification data memory 50 and selected classification vectors C1(u) and C2(u) and outputs results t1 and t2. In this way the projection arithmetic unit 53 performs conversion to an effective feature space for classification and reduces the number of dimensions without lowering the classification performance, thereby decreasing the number of inputs to the classification determination unit. As illustrated in FIG. 11, the projection arithmetic unit 53 includes parallel pairs of multipliers and cumulative adders. The chosen classification vectors C1(u) and C2(u) are applied to the multipliers, the inner products are calculated, and the results t1 and t2 are delivered. This dimension converter which can decrease the number of inputs of the classification determination unit 5 makes it possible to decrease the scale of the unit 5, i.e., raise the processing speed.

The classification determination unit 5 comprises a fuzzy determination unit 54, a logical determination unit 55, and a control unit 58. The fuzzy determination unit 54 converts an input signal into a form suitable for logical determination. The logical determination unit 55 is a logical determination circuit such as an AI. The control unit 58 designates the classification number to a weight memory 57 and to the classification vector memory 52 on the basis of the output from the logical determination unit 55.

The classification determination unit 5 has the advantage that, even if the boundaries of classification are complicated, these classification boundaries can be readily constructed by the use of a neural network.

The fuzzy determination unit 54 consists of a three-hierarchy-level neural network 56 and the weight memory 57. The neural network 56 outputs determination values J1, J2, and J3 in accordance with t1 and t2 from the projection arithmetic unit 53. Therefore, even if it is difficult to determine whether an image is a normal portion or an abnormal portion, correct evaluation values (J1, J2, J3) can be output on the basis of learning data. This allows analog (intuitive) evaluations such as those done by humans. The weight memory 57 stores the weighting coefficients for the neural network 56.

A weighting coefficient is selected from the weight memory 57 in accordance with the classification number designated by the control unit 58 and the value of the distance d, and this selected weighting coefficient is set as the weighting coefficient of the neural network 56. Consequently, it is possible to choose a weight memory value pertinent to the purpose of classification and correct imaging characteristics which are different at different distances, resulting in an improved classification accuracy. The outputs J1, J2, and J3 from the neural network 56 indicate a normal portion, an abnormal portion (malignant), and an abnormal portion (benign), respectively. The value of each output is 0 to 1.0. In accordance with the values of J1, J2, and J3, the logical determination unit 55 selects processing as shown in [DECISION TABLE 1] (to be described later). In Case 4, it is difficult to determine whether the abnormal portion is malignant or benign. In this case, therefore, the determination is reexecuted by choosing the classification vector and the weight that are so learned as to classify only between malignant and benign.

If the determination of the logical determination unit 55 is ambiguous as discussed above, the determination is again executed by feeding the data back to the classification determination unit 5 or to the input stage of the unit 5. This improves the accuracy of the classification determination. While the neural network 56 performs analog (intuitive) evaluations, the logical determination unit 55 can perform digital (logical) evaluations. This makes more complicated classification determination feasible. If the number of times of the feedback exceeds a predetermined number, determination value 5 (meaning classification unknown) is output.

The output determination value from the logical determination unit 55 is supplied to the display unit 6. The display unit 6 includes a display image generator 59 and a monitor 60 which is a display such as a CRT or a flat panel. The display unit 6 changes the color of a region of interest in accordance with the determination value and displays it in an input image. For example, the region is colored green, red, blue, and yellow for the determination values 1 (normal), 2 (malignant), 3 (benign), and 5 (unknown), respectively. Consequently, the classification determination result can be displayed in a visually readily understandable form, making a useful diagnostic support possible.

Note that the classification accuracy can be improved by selecting the value of the classification vector and the value of the weight memory in accordance with output control information (in this case the distance d) from the normalizing unit 42 and/or the classification number.

The learning mode will be described below with reference to FIG. 1B.

The image input device 1 inputs an image which is normalized in terms of the TGC, the waveform, the DR, the gain, and the magnification. The input image is appropriately frozen and stored in the filing device 2. Under the control of the learning controller 7, a designated one of images to be filed is read out and displayed on the display unit 6. An operator (experienced person) designates a desired region in the display and enters teacher information.

The region thus designated is normalized in terms of, e.g., the extracting direction and subjected to pre-processing and multivariate analysis in the feature extracting unit. Consequently, learning data is formed. The classification determination unit performs learning using this learning data.

Figure 5:
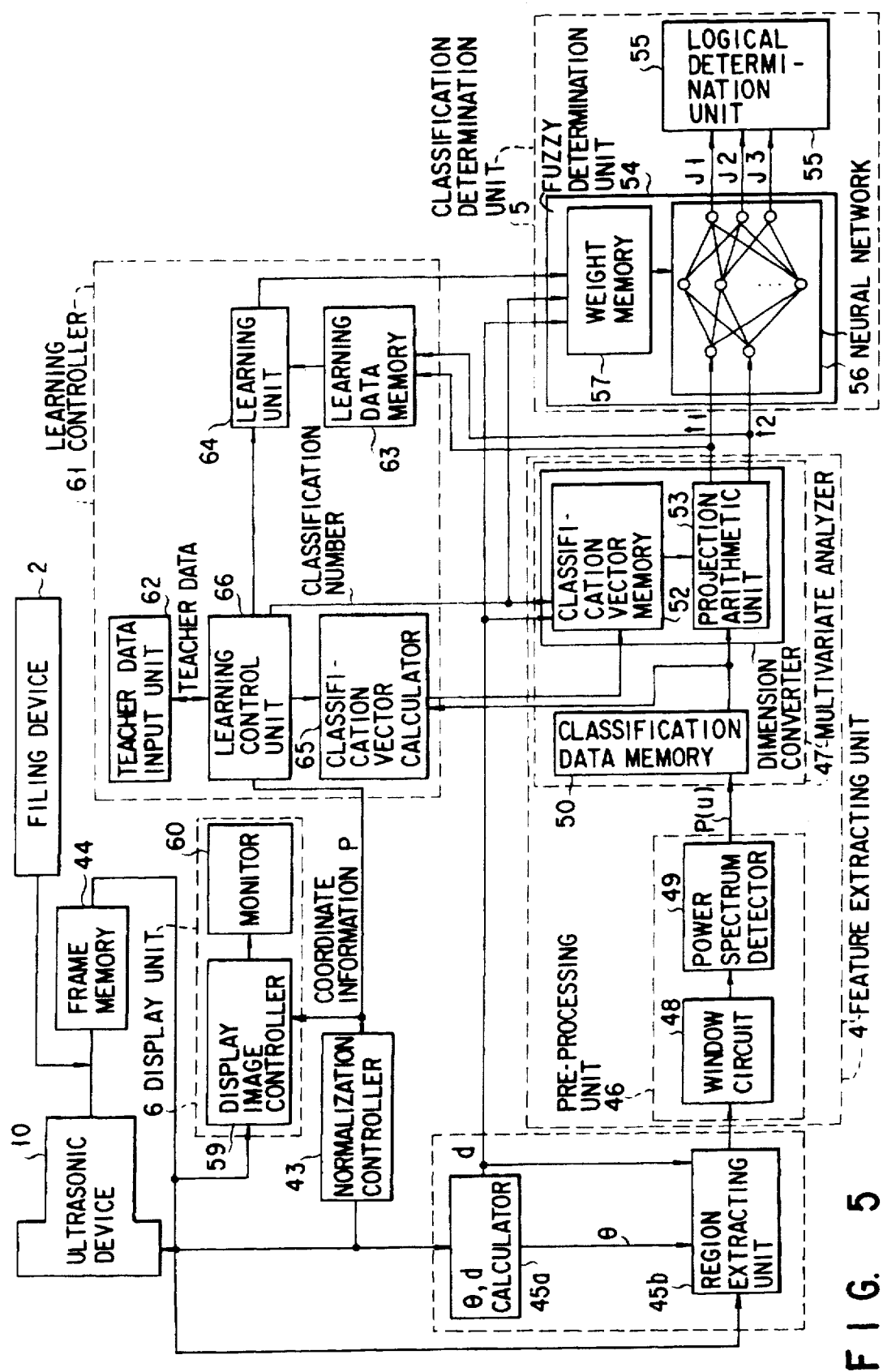
FIG. 5 is a block diagram showing the arrangement for classification learning (learning mode) of the image classification apparatus shown in FIG. 4.

FIG. 5 shows the arrangement for classification determination learning (learning mode) performed by the image classification apparatus in FIG. 4. The same reference numerals as in FIG. 4 denote the same parts in FIG. 5, and a detailed description thereof will be omitted.

The arrangement of this image classification apparatus for the classification determination learning includes a learning controller 61 which outputs the coordinate information P to the normalization controller 43 and the display image generator 59, causing the multivariate analyzer 47 and the fuzzy determination unit 54 to learn their respective predetermined classification numbers.

This learning controller 61 consists of a teacher data input unit 62, a learning data memory 63, a learning unit 64, a classification vector calculator 65, and a learning control unit 66. The teacher data input unit 62 is used by an experienced person such as a medical doctor to input data concerning, e.g., a case of a disease. The learning data memory 63 stores the results t1 and t2 from the projection arithmetic unit 53. The learning unit 64 generates the value of the weight memory on the basis of the data from the learning data memory and the teacher data. The classification vector calculator 65 calculates the classification vector from the classification data from the classification data memory 50. The learning control unit 66 controls the overall learning. The processing conditions of the feature extracting unit 4 are set according to the calculated classification vector.

The teacher data input unit 62 is a user interface with an experienced person, e.g., a medical doctor. While monitoring the contents displayed on the monitor 60, an experienced person moves the window displayed on the monitor 60 by using, e.g., a mouse or a keyboard (not shown), inputting teacher data such as the positions of a normal portion, an abnormal portion (malignant), and an abnormal portion (benign). In addition, by displaying the image region at the designated position in a different color, the region that is entered as the teacher data can be made visually readily recognizable. The values of θ and d are calculated on the basis of the coordinate information of the designated position. Since useful information prepared by an experienced person can be easily entered in this fashion, it is always possible to readily input data of, e.g., a new case of a disease at a later time and thereby redo learning. The contents of the teacher data are not restricted to information about a normal portion, an abnormal portion (malignant), and an abnormal portion (benign). As an example, the name of an abnormal portion can also be entered.

The learning control unit 66 controls the entire learning in accordance with the designation from the teacher data input unit 62 and outputs control information by which the values of the classification vector memory 52 and the weight memory 57 are calculated in accordance with the distance d and the classification number. As in FIG. 8, this distance d is divided into a plurality of levels, e.g., four levels of d1, d2, d3, and d4 in accordance with the distance range. In addition, a plurality of, e.g., two levels, classification numbers 1 and 2, are set as the classification numbers as will be described later. As a consequence, the accuracy of classification determination is improved.

The learning unit 64 causes the neural network 56 to learn. The learning data memory 63 stores learning data to be applied to the neural network 56.

The classification data memory 50 stores the power spectrum P(u) calculated by the power spectrum detector 49. The power spectrum P(u) is stored for each teacher data (normal, abnormal (malignant), or abnormal (benign)) or for each image distance d (d1, d2, d3, or d4).

The classification vector calculator 65 calculates the classification vector from the power spectrum P(u) stored in the classification data memory 50. More specifically, as described in Japanese Patent Application No. 5-264781 proposed by the present applicant, a vector for classification into two classes is calculated by a statistical method using an FS transform or the like. In this way, the classification vector calculator 65 calculates classification vector 1 (classification number 1) for classification into two classes, normal and a mixture of abnormal (malignant) and abnormal (benign), and classification vector 2 (classification number 2) for classification into two classes, abnormal (malignant) and abnormal (benign), which is used in feedback. These classification vectors 1 and 2 are also calculated with respect to the distances d1, d2, d3, and d4 and written at predetermined addresses of the classification vector memory 52. Likewise, the value of the weight memory 57 is calculated in accordance with each classification number and each distance and written at a predetermined address.

The operation of the image classification apparatus with the above arrangement will be described below.

In this image classification apparatus, if neither of the learning mode nor the execution mode is selected, the switch 130 of the ultrasonic device as an input device and the switches of the normalizing unit 36 are closed to the positions A (FIG. 3). Consequently, the TGC amplification factor, the DR, the gain, and the magnification that are designated by a use are selected, entered, and displayed. If the learning mode or the execution mode is chosen, the individual switches described above are closed to the positions B. As a result, the TGC amplification factor, the DR, the gain, and the magnification are entered after being normalized to their respective predetermined values, and feature extraction and classification determination are performed.

In this embodiment, three different portions, i.e., a normal portion, an abnormal portion (malignant), and an abnormal portion (benign) are classified. That is, these three types of regions are designated in the learning mode.

Classification numbers 1 and 2 are switched in accordance with the purpose of classification. Classification number 1 corresponds to the purpose of classifying a normal portion and an abnormal portion (both malignant and benign). Classification number 2 corresponds to the purpose of classifying an abnormal portion (malignant) and an abnormal portion (benign). Learning is done for each classification number. In execution, classification number 1 is executed. If the determination is difficult, feedback control is performed by selecting classification number 2.

The learning mode will be described below with reference to FIG. 5.

An image which is normalized in terms of the TGC amplification factor, the waveform, the DR, the gain, and the magnification is properly frozen and stored in the filing device 2. Under the control of the learning controller 61, a designated image is read out from the filing device 2, stored in the frame memory 44, and displayed on the monitor 60 of the display unit 6.

An experienced person, e.g., a medical doctor, designates a region such as a morbid portion by using a mouse or the like device and gives the region teacher information about, e.g., the type of the disease. The designated region is normalized in terms of, e.g., the extracting direction. The power spectrum P(u) is calculated by the feature extracting unit 4 and stored in the classification data memory 50. The learning controller 61 selectively reads out the data from the classification data memory 50 in accordance with the classification number and calculates the classification vector and the weight of the neural network 56. This calculation is also done for each distance d, as well as for each classification number.

Note that it is also possible to directly designate a region in an image from the ultrasonic device 10 and give the region teacher information, without temporarily storing the image in the filing device 2.

Also, correction of the magnification can be performed at the same time the region is extracted (the region extracting unit 45b). This learning controller can be a detachable unit. Alternatively, another computer can be used to compute the values of the weight memory and the classification vector memory as off-line processing. Furthermore, in this embodiment an FS transform is used as a statistical method of obtaining the classification vectors. However, an HTC (Hotelling Trace Criterion) known as a method of classifying into multiple classes also can be used.

The execution mode will be described below with reference to FIG. 4.

The ultrasonic device 10 as an image input device inputs an image which is normalized in terms of the TGC amplification factor, the waveform, the DR, the gain, and the magnification. The range designating unit 41 sequentially supplies coordinate information to normalize, e.g., the extracting direction of the region. The feature extracting unit 4 performs pre-processing (calculation of the power spectrum) and multivariate analysis and applies the values t1 and t2 to the classification determination unit 5. In the classification determination unit 5, the neural network 56 outputs J1, J2, and J3, and the logical determination unit 55 performs determination according to these values. A feedback calculation is performed as needed, and the result is synthesized with the original image and displayed on the display unit 6. The above processing is performed throughout the entire region designated by the range designating unit 41.

An image can also be directly input from the image input device (the ultrasonic device 10) or can be either a frozen image or moving images sequentially supplied. Alternatively, images recorded in the filing device 2 can be read out.

In this embodiment, the neural network has three hierarchy levels. However, the neural network is not limited to this one but can be one having two hierarchy levels or multiple hierarchy levels. A feedback type (total coupling type) neural network also can be used. Additionally, in this embodiment a Fourier transform is used to utilize its power. However, it is also possible to use another orthogonal transformation, such as cosine transformation or wavelet transformation.

[DECISION TABLE 1]

Case 1: $J1 \geq 0.7$ and $J2, J3 \leq 0.3$

Determine the region is a normal portion and output determination value 1.

Case 2: $J2 \geq 0.7$ and $J1, J3 \leq 0.3$

Determine the region is an abnormal portion (malignant) and output determination value 2.

Case 3: $J3 \geq 0.7$ and $J1, J2 \leq 0.3$

Determine the region is an abnormal portion (benign) and output determination value 3.

Case 4: J1<0.5 and (J2>0.5 or J3>0.5)

Determine the region is an abnormal portion and output determination value 4.

Select a classification spectrum and a weight memory (classification number 2) for discrimination of an abnormal portion, and reexecute determination (feedback).

Case 5: Other cases

Determine the classification of the region is unknown and output determination value 5.

The second embodiment of the present invention will be described below with reference to FIG. 6A. In this embodiment, the arrangement of an image classification apparatus which does not employ the neural network used in the classification determination unit of the first embodiment will be described. In the second embodiment, only the characteristic portions will be discussed, since the rest of the arrangement is identical with the first embodiment shown in FIGS. 4 and 5.

As in FIG. 6A, a classification determination unit 5a consists of a logical determination unit 55 and a determination table 71. In this determination table 71, feature values t1 and t2 obtained by a projection arithmetic unit 53 are directly related to determination values. As in the weight memory 57 shown in FIG. 4, each value is predetermined in accordance with the distance d or the classification number. When classification number 1 is selected, as in FIG. 12A, output values are determination value 1 for a region A,
determination value 2 for a region B,
determination value 3 for a region C,
determination value 4 for a region D, and
determination value 5 for other cases.

When classification number 2 is selected, as in FIG. 12B, output values are determination value 2 for a region A,
determination value 3 for a region B, and
determination value 5 for other cases.

As the boundary values of this table, class-to-class distances as described in "Image Analysis Handbook" (Publishing Department of Tokyo University), p. 656 can be used. Alternatively, the boundary values can be determined in advance by learning using another neural network.

When the classification determination unit 5a with the above arrangement is used in the image classification apparatus, calculations are performed by table calculations. Consequently, the calculation speed is increased and the calculation time is shortened compared to an apparatus using a neural network.

The third embodiment of the present invention will be described below with reference to FIG. 6B. In this embodiment, a modification of the display unit 6 of the first embodiment will be described. In the third embodiment, only the characteristic portions will be discussed, since the rest of the arrangement is the same as the first embodiment illustrated in FIGS. 4 and 5.

In the previous first embodiment, the display image generator 59 colors a region in accordance with the determination value from the logical determination unit 55.

Even if it is determined that the region is an abnormal portion (malignant), however, this portion can have various states; e.g., the disease may have progressed to a very bad condition, or, in contrast, the portion may be close to a normal portion. This information is not reflected on the data. In the third embodiment, therefore, the output from a neural network is directly used in coloring. As shown in FIG. 6B, image information is added to the values of J1, J2, and J3 and the results are input as R, G, and B values, thereby forming an NTSC signal. A constant C in FIG. 6B is a parameter for determining the degree of weighting with which the image information is to be added. The color is lightened as the value increases and darkened as the value decreases.

In the third embodiment, a region in which the order of the values of J1, J2, and J3 is distinct (i.e., the classification result is clear) is displayed with a high color saturation so as to be visually impressive. Even if the order of the values of J1, J2, and J3 is uncertain, this information is displayed as a slight difference in color so as to effectively function as a diagnostic support. As an example, a region which is gradually changing from a normal portion to a malignant abnormal portion is displayed in an intermediate color between green and red. It is naturally possible to use the output in the second embodiment as the input in this third embodiment. It is also possible to color a region according to the outputs t1 and t2. That is, as illustrated in FIG. 6C, a malignant abnormal portion, a benign abnormal portion, and another portion are colored "red", "blue", and "green", respectively. Additionally, each abnormal portion can be made visually more recognizable by darkening the color in the center of the region and making the color lighter toward the boundary.

Figure 16:
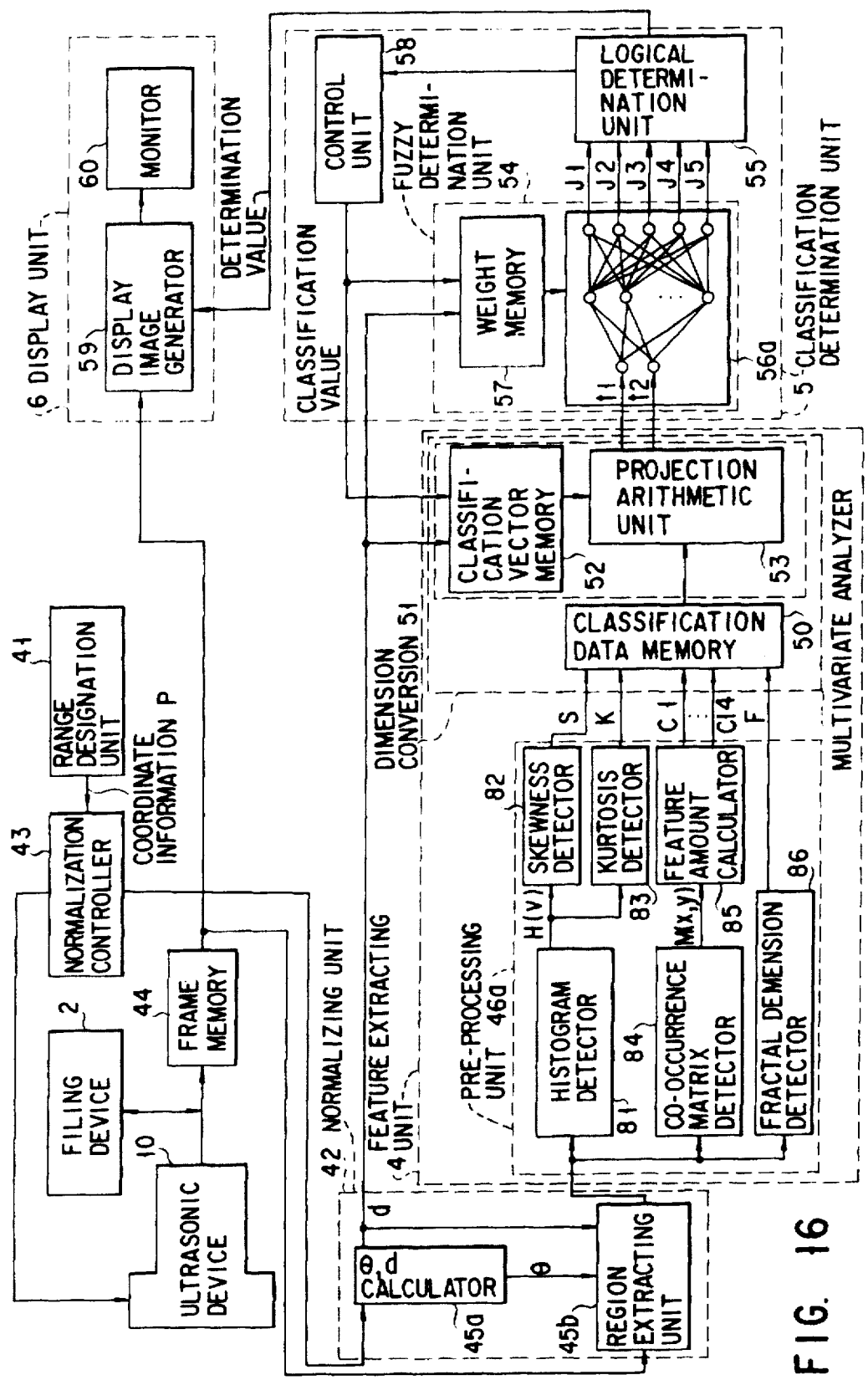
FIG. 16 is a block diagram showing the arrangement of an image classification apparatus according to the fourth embodiment.

The arrangement of an image classification apparatus according to the fourth embodiment of the present invention will be described below with reference to FIG. 16. The same reference numerals as in the first embodiment shown in FIGS. 4 and 5 denote the same parts in FIG. 16, and a detailed description thereof will be omitted.

Figure 13:
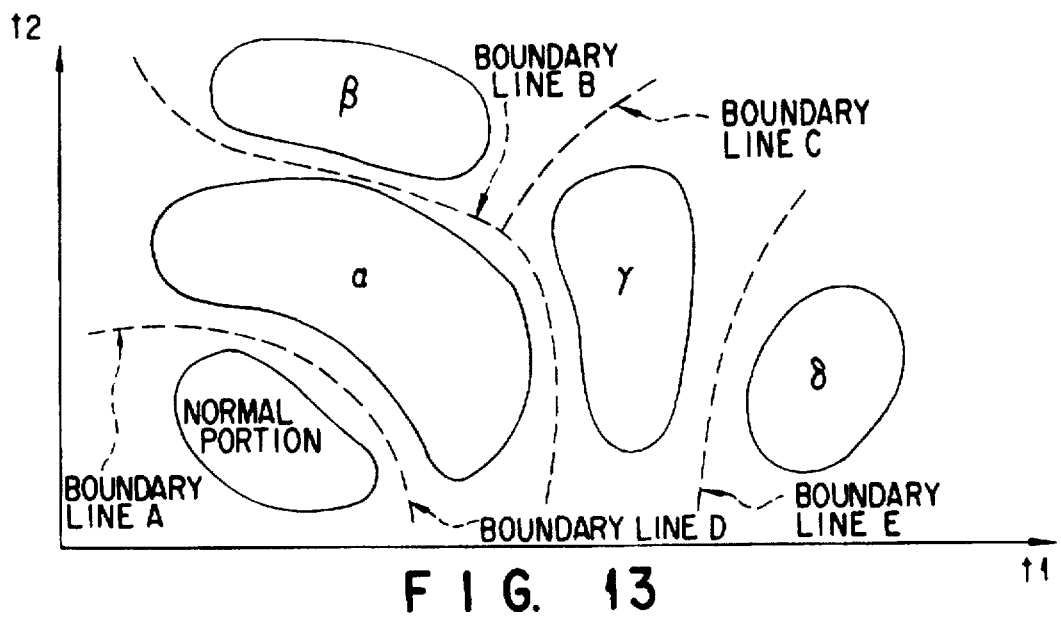
FIG. 13 is a view showing the state in which an image is divided into one normal portion and four abnormal portions (morbid portions $\alpha$, $\beta$, $\gamma$, k, and $\epsilon$)

The fourth embodiment differs from the first embodiment in the classification method; that is, regions are classified into a normal portion and four abnormal portions (morbid portions α, β, γ, and δ), as illustrated in FIG. 13. These regions are isolated according to the values of t1 and t2. If regions are close to boundaries, reclassification is performed by feedback, thereby improving the accuracy.

The arrangement of a pre-processing unit 46a of a feature extracting unit 4 of the fourth embodiment is different from that of the pre-processing unit 46 of the first embodiment.

This pre-processing unit 46a includes a histogram detector 81, a skewness detector 82, a kurtosis detector 83, a co-occurrence matrix detector 84, a feature amount calculator 85, and a fractal dimension detector 86. The skewness detector 82 is connected to the output of the histogram detector 81 to detect the skewness of a histogram. The kurtosis detector 83 is also connected to the output of the histogram detector 81 to detect the kurtosis of a histogram. The feature amount detector 85 is connected to the output of the co-occurrence matrix detector 84.

The fourth embodiment makes use of information of a histogram, a co-occurrence matrix, and a fractal dimension, instead of the power spectrum used in the first embodiment. The apparatus obtains a classification vector by regarding feature amounts extracted from these information as one multidimensional data. A neural network 56a has five output layers corresponding to objects to be classified.

Calculations of feature amounts of the skewness and the kurtosis of a histogram, the co-occurrence matrix, and the fractal dimension will be briefly described below.

Figure 26:
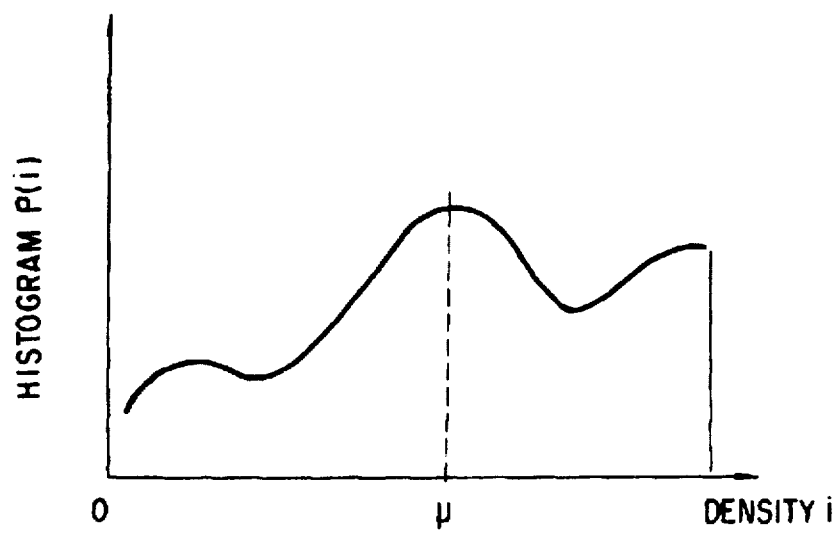
FIG. 26 is a graph showing the relationship between the histogram and the image density level.

A histogram is a cumulative number corresponding to an image density level. For example, an 8-bit monochromatic image shown in FIG. 26 has 256 gradation levels from 0 to 255 as density levels, so the histogram indicates the number of pixels at each gradation level in the image.

The skewness, S, of a histogram represents the degree of skew of the shape of the histogram from a symmetrical shape. The uniformity of a pattern can be determined from the skewness of a histogram.

The kurtosis, K, of a histogram indicates whether the distribution of the histogram is concentrated around the mean value ($\mu$) or spreads toward the edges. The kurtosis of a histogram shows whether an image has a fine pattern or a rough pattern. [Eq. 2]

$$S = \frac{\sum_{i=0}^{255} (i-\mu)^3 \cdot P(i)}{\sigma^3}$$

$$\begin{cases} \mu = \sum_{i=0}^{255} i \cdot P(i) \\ \sigma = \sum_{i=0}^{255} (i-\mu)^2 \cdot P(i) \end{cases}$$

$$K = \frac{\sum_{i=0}^{255} (i-\mu)^4 \cdot P(i)}{\sigma^4}$$

The co-occurrence matrix is a matrix having, as its element, probability $P\delta$ (i,j) (i,j=0, 1, 2, ..., n−1) with which the density at a point separated by a fixed displacement $\delta=(r,\theta)$ from the point at which the image density is i is j. Note that n is the number of gradation levels. Fourteen types of feature amounts are calculated from this matrix, and with these values the texture is characterized. This co-occurrence matrix allows extraction of finer features of an image than using, e.g., a Fourier transform. Consequently, speckle patterns, for example, which occur in ultrasonic images can be expressed as numerical values.

The fractal dimension is a dimension which takes a non-integral value and is used as an index for expressing the complexity of a figure. With this fractal dimension, the features of self-similar shapes such as those present in the natural world can be easily expressed by numerical values. Details of the skewness and the kurtosis of a histogram, the co-occurrence matrix, and the fractal dimension are described in "Image Analysis Handbook", Publishing Department of Tokyo University, p. 518, pp. 518 to 521, and pp. 528 to 538, respectively.

In the fourth embodiment, the following classification vectors correspond to individual classification numbers.

Classification number 1: Classify into a normal portion and four abnormal portions (morbid portions $\alpha$, $\beta$, $\gamma$, and $\delta$).

Classification number 2: Classify into a normal portion and a morbid portion $\alpha$.

Classification number 3: Classify into morbid portions $\alpha$ and $\beta$.

Classification number 4: Classify into morbid portions $\beta$ and $\gamma$.

Classification number 5: Classify into morbid portions $\alpha$ and $\gamma$.

Classification number 6: Classify into morbid portions $\gamma$ and $\delta$.

A determination unit performs the following processing.
Case 1: J1≧0.7 and J2, J3, J4, J5≦0.3
Determine the region is a normal portion and output determination value 1.
Case 2: J2≧0.7 and J1, J3, J4, J5≦0.3
Determine the region is a morbid portion $\alpha$ and output determination value 2.
Case 3: J3≧0.7 and J1, J2, J4, J5≦0.3
Determine the region is a morbid portion $\beta$ and output determination value 3.
Case 4: J4≧0.7 and J1, J2, J3, J5≦0.3

Determine the region is a morbid portion $\gamma$ and output determination value 4.
Case 5: J5≧0.7 and J1, J2, J3, J4≦0.3
Determine the region is a morbid portion $\delta$ and output determination value 5.
Case 6: J1, J2≧0.5 and J3, J4, J5≦0.3
Determine the region is close to a boundary line A, select classification number 2, and perform feedback.
Case 7: J2, J3≧0.5 and J1, J4, J5≦0.3
Determine the region is close to a boundary line B, select classification number 3, and perform feedback.
Case 8: J3, J4≧0.5 and J1, J2, J5≦0.3
Determine the region is close to a boundary line C, select classification number 4, and perform feedback.
Case 9: J2, J4≧0.5 and J1, J3, J5≦0.3
Determine the region is close to a boundary line D, select classification number 5, and perform feedback.
Case 10: J4, J5≧0.5 and J1, J2, J3≦0.3
Determine the region is close to a boundary line E, select classification number 6, and perform feedback.
Case 11: Other cases
Determine the classification of the region is unknown and output determination value 11.

Examples of colors corresponding to the determination values are as follows.

| | |
|---|---|
| Determination value 1 | green |
| Determination value 2 | red |
| Determination value 3 | blue |
| Determination value 4 | purple |
| Determination value 5 | orange |
| Determination value 6 | yellow |

In this embodiment, the method of learning is performed in the same manner as in the first embodiment. Calculations of the feature amounts (the skewness and the kurtosis of a histogram, the co-occurrence matrix, and the fractal dimension) are identical with those discussed previously.

In the fourth embodiment, a combined effect can be obtained by analyzing the feature amounts (information about, e.g., the histogram, the co-occurrence matrix, and the fractal dimension), that are totally independent of each other in respect of calculations, by regarding them as one multi-dimensional data. Additionally, a number of regions can be classified and displayed in different colors so as to be easily distinguishable. This readily makes it possible to increase the number of feature amounts used in the pre-processing unit.

Also, the use of the neural network in a fuzzy determination unit facilitates detection of the classification boundaries between a normal portion and four abnormal portions ($\alpha$, $\beta$, $\gamma$, and $\delta$).

Figure 27:
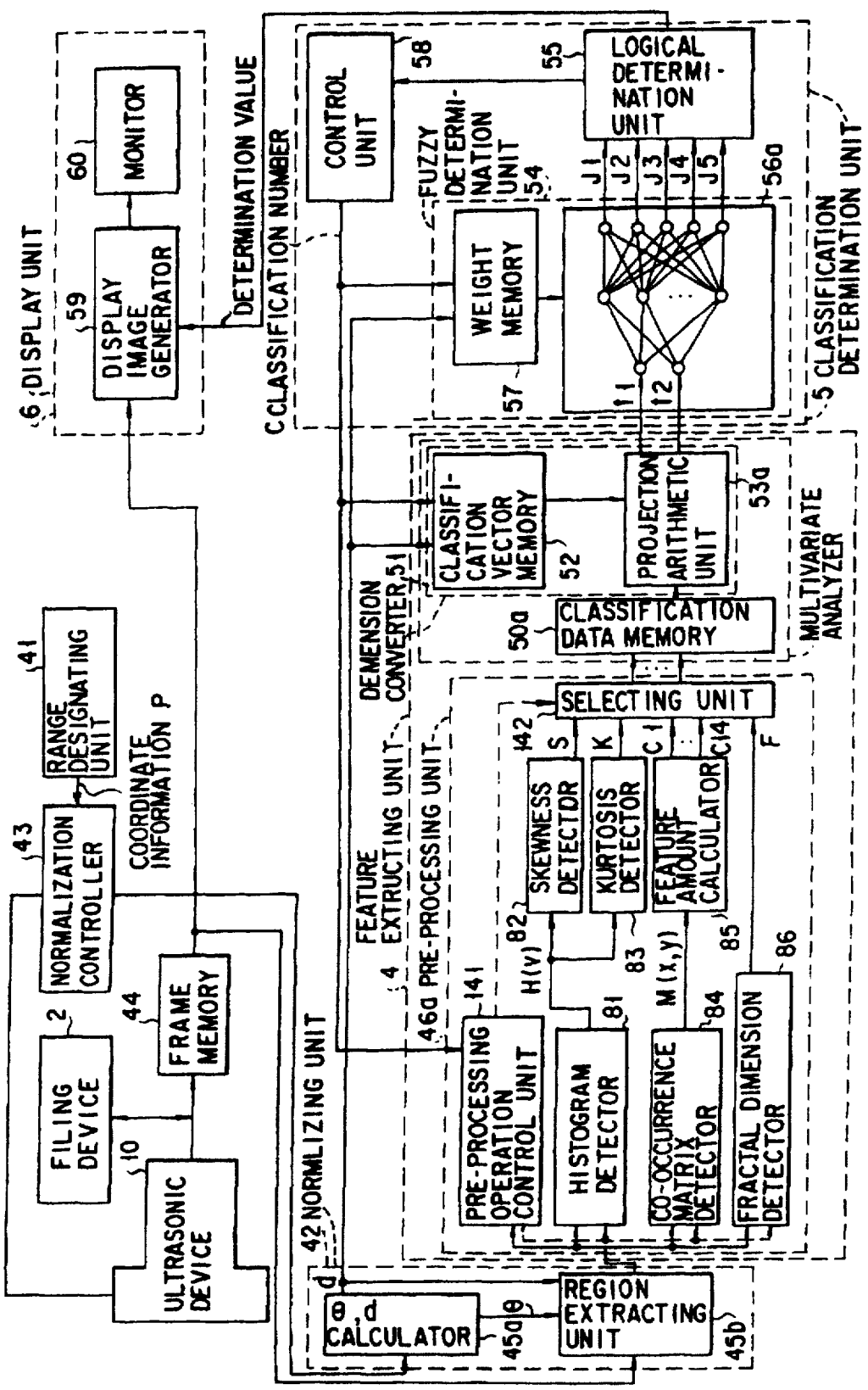
FIG. 27 is a block diagram showing the arrangement of an image classification apparatus as a modification of the fourth embodiment.

The arrangement of an image classification apparatus as a modification of the fourth embodiment will be described below with reference to FIG. 27. This embodiment differs from the fourth embodiment in the arrangement of a pre-processing unit; i.e., the pre-processing unit of this embodiment has a pre-processing operation control unit 141 and a selecting unit 142. The pre-processing operation control unit 141 controls, e.g., the operation parameters of a histogram detector 81, a co-occurrence matrix detector 84, and a fractal dimension detector 86. The operation parameter is, for the histogram detector 81, the number of gradation levels of a histogram, for the co-occurrence matrix detector 84, the positional relationship amount between two points for calculating a co-occurrence matrix, and for the fractal dimension detector 86, the method of calculating a fractal dimension.

The pre-processing operation control unit 141 also controls the selecting unit 142 to select one of extracted feature amounts to be supplied to a classification data memory or the like.

By the functions of the pre-processing operation control unit 141, it is possible to select a feature amount calculating method and a feature amount for use in classification in accordance with an object to be classified. This further improves the classification accuracy. The pre-processing operation control unit 141 is controlled by a signal (classification number) from a control unit 58. That is, during feedback control the classification performance can be further improved by changing not only the selection of a classification vector memory 52 or a weight memory 57 but also the selection of a feature amount calculating method and a feature amount to be used in classification.

In this embodiment, all outputs from the selecting unit 142 are applied to a multivariate analyzer. However, these outputs can also be input directly to a fuzzy determination unit 54 and a logical determination unit 55.

Figure 17:
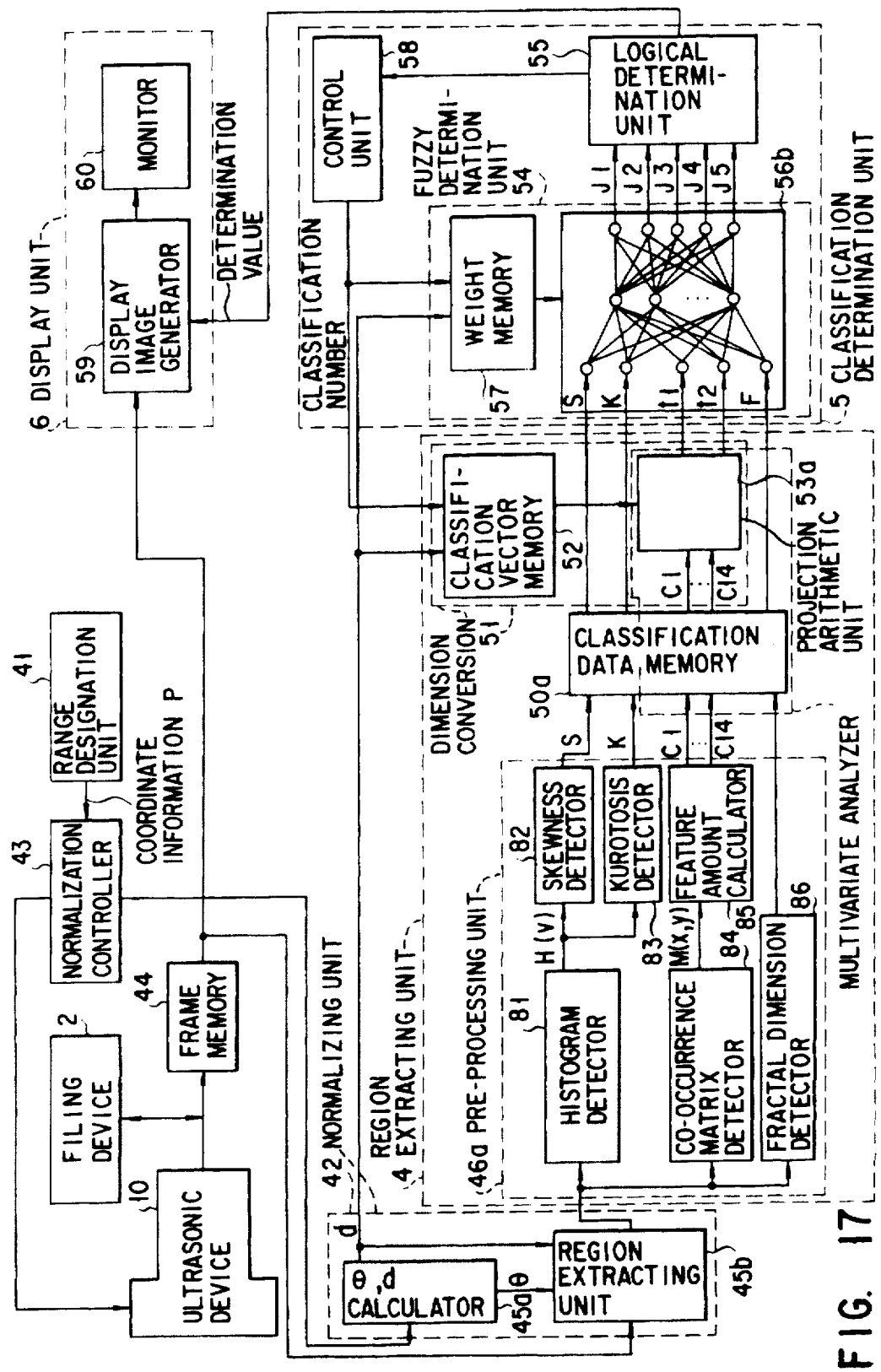
FIG. 17 is a block diagram showing the arrangement of an image classification apparatus according to the fifth embodiment.

The arrangement of an image classification apparatus according to the fifth embodiment of the present invention will be described below with reference to FIG. 17. This embodiment is different from the fourth embodiment in that not all data subjected to pre-processing are supplied to a multivariate analyzer, i.e., some data are directly input to a classification determination unit.

That is, skewness S from a skewness detector 82, kurtosis K from a kurtosis detector 83, and fractal dimension F from a fractal dimension detector 86 are applied to a classification data memory 50a. However, these data are directly input to the input layer of a neural network 56b without passing through a projection arithmetic unit 53a. Also, outputs c1 to c14 from a feature amount calculator 85 are subjected to multivariate analysis performed by the projection arithmetic unit 53a, and results t1 and t2 are applied to the input layer of the neural network 56b. For this purpose, the input layer of the neural network 56b consists of a number of input units to correspond to the number of input data. The number of input units is five in this embodiment. The constituent parts other than the multivariate analyzer of the fifth embodiment are identical with those of the fourth embodiment, so these parts are denoted by the same reference numerals as in the fourth embodiment and a detailed description thereof will be omitted.

In the image classification apparatus of the fifth embodiment, the number of dimensions used in the projection arithmetic unit can be decreased, and this increases the calculation speed. Furthermore, if feature amounts are already found to be effective in classification, the accuracy is increased by directly applying these amounts to the classification determination unit. In this embodiment, the multivariate analysis is performed for feature amounts obtained from a co-occurrence matrix. It is of course possible to perform the multivariate analysis for some other feature amounts.

Figure 18:
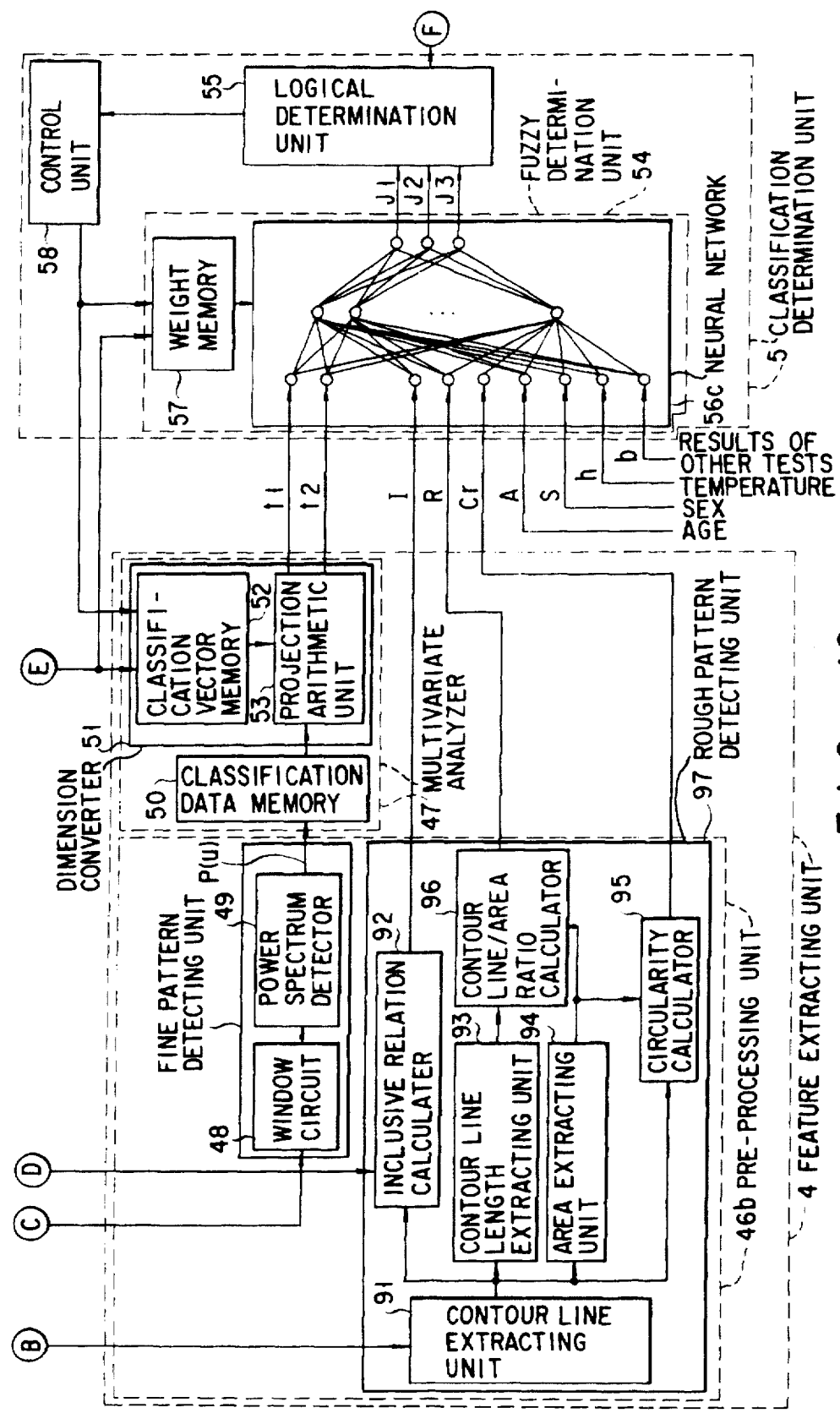
FIG. 18 is a block diagram showing the last-half arrangement of an image classification apparatus according to the sixth embodiment.
Figure 19:
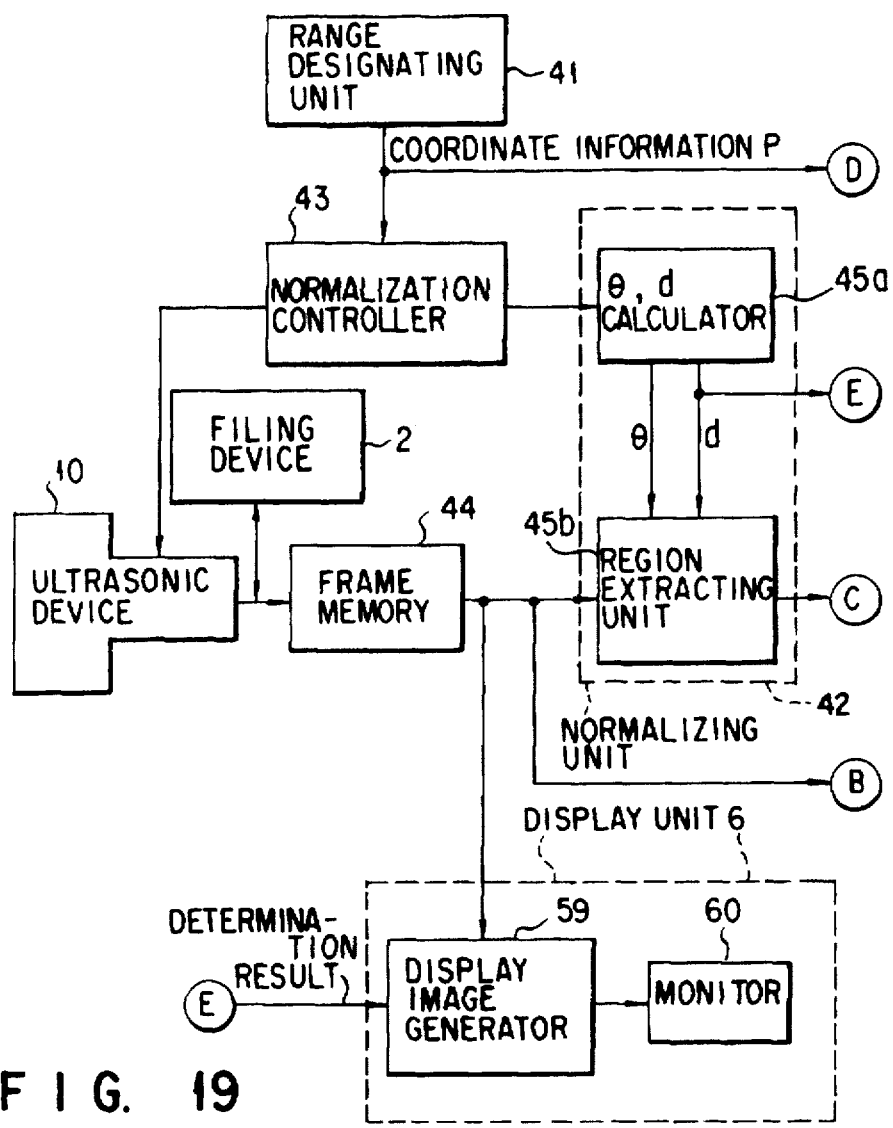
FIG. 19 is a block diagram showing the first-half arrangement of the image classification apparatus according to the sixth embodiment.

The arrangement of an image classification apparatus according to the sixth embodiment of the present invention will be described below with reference to FIGS. 18 and 19. The same reference numerals as in the first embodiment shown in FIG. 4 denote the same parts in FIGS. 18 and 19, and a detailed description thereof will be omitted. This embodiment includes a fine pattern detecting unit 46a for detecting a power spectrum described in the first embodiment, and a rough pattern detecting unit 97 for detecting the feature of a rough pattern. The rough pattern detecting unit 97 consists of a contour line extracting unit 91, an inclusive relation calculator 92, a contour line length extracting unit 93, an area extracting unit 94, a circularity calculator 95, and a contour line/area ratio calculator 96. The contour line extracting unit 91 receives image data read out from a frame memory 44 and extracts the contour line of the image. The inclusive relation calculator 92 determines whether a designated region (coordinate information P) is in a region enclosed within the contour line. The contour line length extracting unit 93 extracts the length of the extracted contour line. The area extracting unit 94 extracts the area of the region enclosed within the contour line. The circularity calculator 95 calculates the circularity from the contour line and the area of the region enclosed within the contour line. The contour line/area ratio calculator 96 calculates a predetermined feature amount from the ratio of the contour line to the area.

Similar to the input layer of the fifth embodiment, the input layer of a neural network of a fuzzy determination unit 54 is constituted by a number of units so as to process a plurality of input data. The arrangement of the components from the output layer of the neural network of the image classification apparatus of this embodiment is identical with that of the first embodiment.

Figure 20:
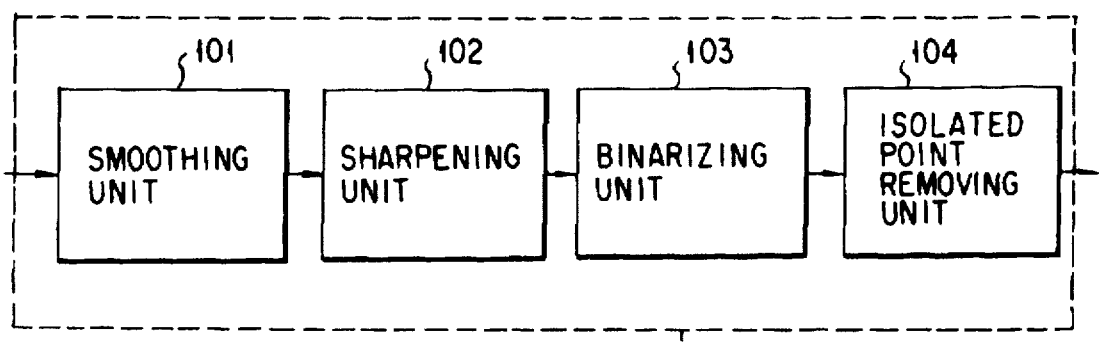
FIG. 20 is a block diagram showing a practical arrangement of a contour line extracting unit.

A practical arrangement of the contour line extracting unit 91 is shown in FIG. 20.

The contour line extracting unit 91 consists of a smoothing unit 101, a sharpening unit 102, a binarizing unit 103, and an isolated point removing unit 104. The smoothing unit 101 removes noise from an image to prevent extraction of unnecessary contour lines. The sharpening unit 101 is constituted by an edge detection filter such as a Laplacian filter. The binarizing unit 103 extracts a contour line by using binarization. The isolated point removing unit 104 removes isolated points by means of a median filter, erosion, or dilation, thereby erasing unnecessary contour lines. Line width reduction processing can be performed before these arithmetic operations. Also, contour tracking processing can be performed after the isolated point removal.

When the inclusive relation calculator 92 determines that a designated region is enclosed within a contour line, there is a high possibility that this region is an abnormal portion. In addition, the accuracy is improved since the inclusive relation calculator 92 can perform determinations not only from texture information but from structural information.

Figure 14A:
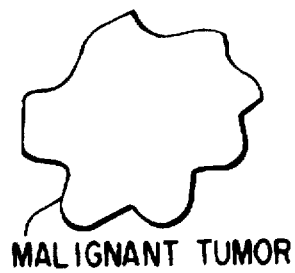
FIG. 14A is a view showing the shape (contour) of a malignant tumor.
Figure 14B:
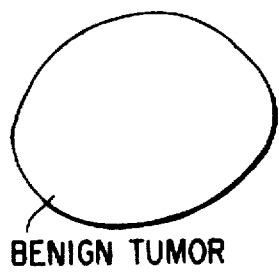
FIG. 14B is a view showing the shape (contour) of a benign tumor.

As illustrated in FIG. 14A, if a tumor to which a designated region belongs is malignant, the region has a very rough circumference. In contrast, in the case of a benign tumor the circumference is smooth as in FIG. 14B. Consequently, the length of the contour line of a malignant tumor is larger than that of a benign tumor for the same area. The contour line/area ratio calculator 96 calculates a feature amount by using this phenomenon. The foregoing relates to processing for one image frame. If, however, a plurality of image frames are input to make formation of three-dimensional image data possible, a similar determination can be accomplished by comparing the volume with the surface area.

The contour line/area ratio calculator 96 permits determination of malignant and benign tumors also from the shape of the contour line. This further improves the accuracy of the determination.

Figure 15A:
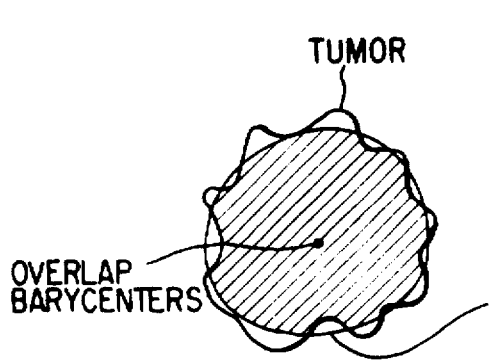
FIGS. 15A and 15B are views showing an example of tumor detection.
Figure 15B:
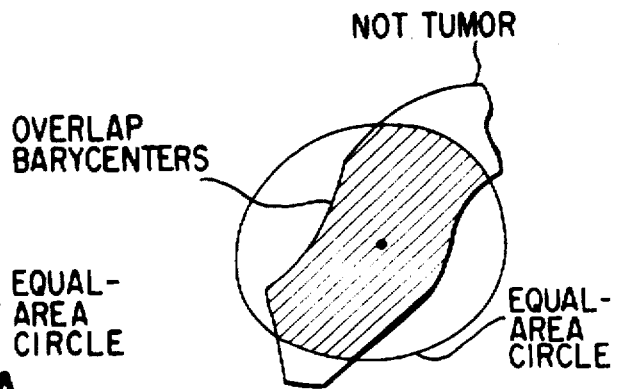

In the contour line extraction, a portion of an organ or a vein in a body is sometimes erroneously detected in addition to a tumor. To remove this, the circularity calculator 95 uses the fact that the shape of a tumor is roughly close to a circle. That is, as illustrated in FIGS. 15A and 15B, a circle having the same area as the area of a region enclosed within the detected contour line is superposed on the region such that their barycenters overlap each other. The circularity calculator 95 detects the area (hatched portion) of the overlapped region. The higher the ratio of the area of this overlapped region to the area of the circle, the more circular the region, i.e., the region is more likely to be a tumor.

As discussed above, the circularity calculator 95 can increase the accuracy of tumor detection.

In this embodiment, information to be input to the neural network 56, other than information obtained from images, e.g., information used by medical doctors in actual diagnoses, such as the age, the sex, the temperature, and the results of other tests (e.g., a blood test, a CT test, an X-ray test, and an endoscopic test), are applied to the classification determination unit. Note that it is also possible to use the result of the previous diagnosis, a factor such as pain which indicates the seriousness of a disease, and the pulse, in addition to the above information.

Determinations can be performed at a higher accuracy by using these pieces of information used by medical doctors in actual diagnoses in addition to information obtained from images.

The feature extracting unit 4 of this image classification apparatus also detects information of the contour line and inputs the obtained feature amount to the classification determination unit. The information (e.g., the age, the sex, the temperature, and the results of other tests), other than information obtained from images, also are applied to the neural network 56c of the classification determination unit 5. With this arrangement, comprehensive determinations can be made not only from the texture information obtained by the fine pattern detecting unit but also from the structural information obtained by the rough pattern detecting unit and from the information about patients. Consequently, the accuracy of diagnoses can be further improved.

Figure 21:
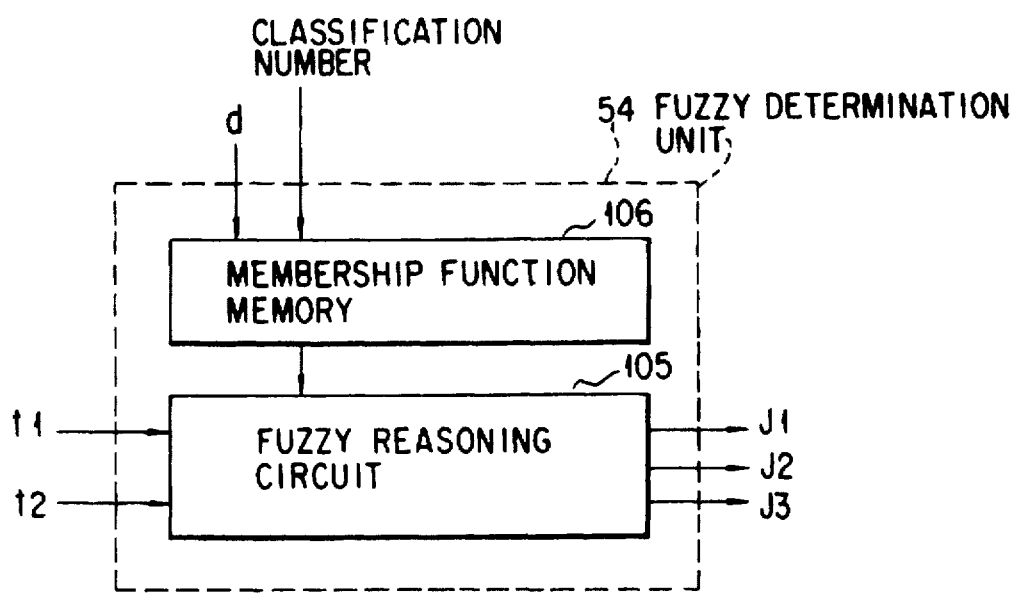
FIG. 21 is a block diagram showing the arrangement of an image classification apparatus using fuzzy reasoning according to the seventh embodiment.

FIG. 21 shows the seventh embodiment of the present invention. In this embodiment, a fuzzy determination unit of a classification determination unit uses fuzzy reasoning. That is, in each of the previous embodiments the fuzzy determination unit uses a neural network in determination. In this embodiment, a fuzzy reasoning circuit 105 is used in place of the neural network 56, and a membership function memory is used in place of the weight memory 57. The rest of the arrangement is identical with that of the first embodiment.

The image classification apparatus of this embodiment has the advantage that the calculation speed can be increased due to a small circuit configuration, in comparison with the neural network.

Figure 23:
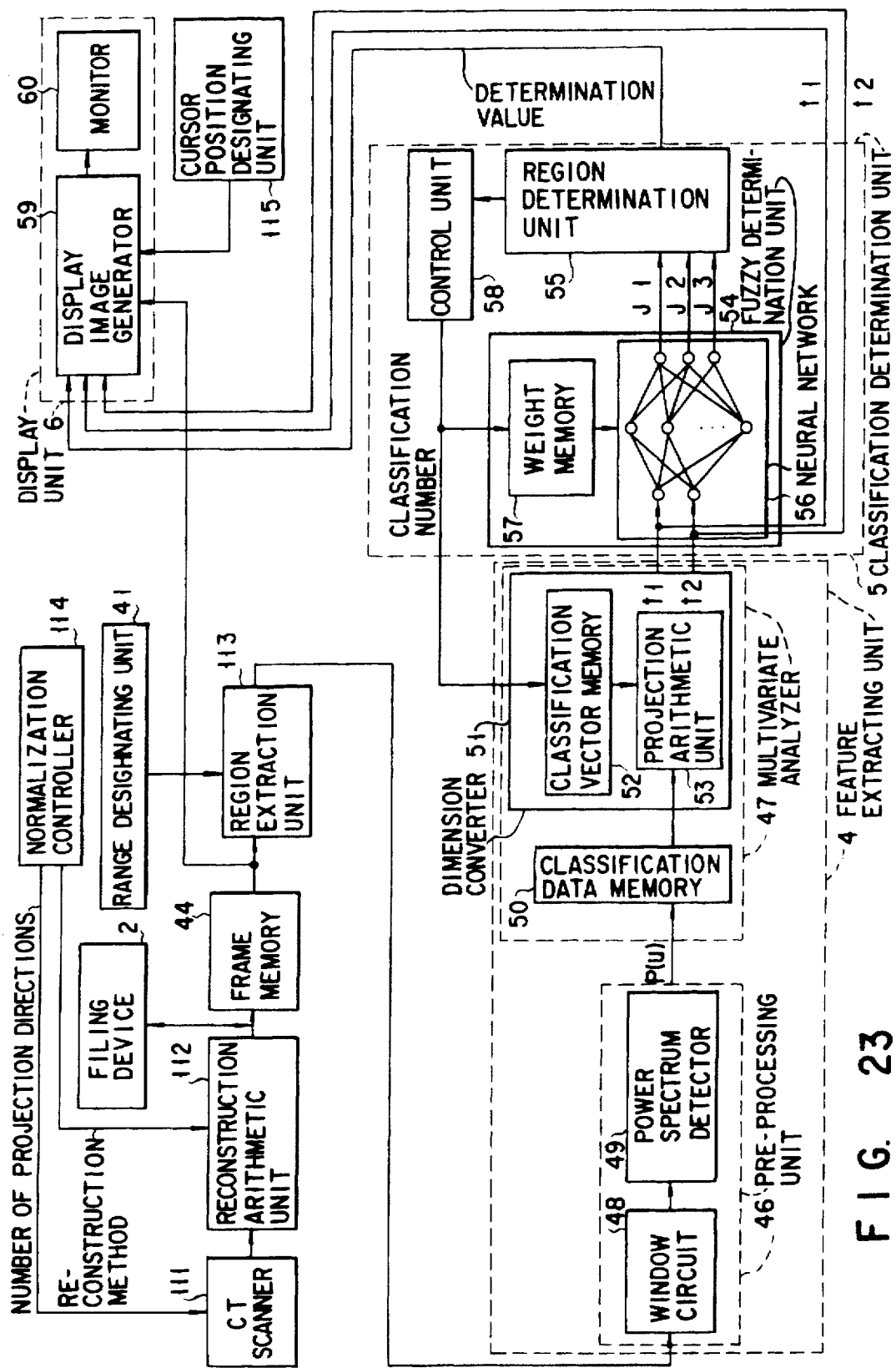
FIG. 23 is a block diagram showing the arrangement of an image classification apparatus according to the eighth embodiment.

The arrangement of an image classification apparatus according to the eighth embodiment of the present invention will be described below with reference to FIG. 23. The same reference numerals as in the first embodiment shown in FIG. 4 denote the same parts in FIG. 23, and a detailed description thereof will be omitted.

This image classification apparatus comprises a CT scanner 111 serving as an image input device, a reconstruction arithmetic unit 112, a region extracting unit 113, a normalization control unit 114, and a cursor position designating unit 115 such as a mouse. The reconstruction arithmetic unit 112 reconstructs an image (image data) from an input image signal from the CT scanner. The region extracting unit 113 extracts a predetermined region in accordance with coordinate information from a range designating unit 41 via a frame memory 44. The normalization control unit 114 gives a certain number of projection directions to the CT scanner 111 and designates a reconstruction method to the reconstruction arithmetic unit 112. The cursor position designating unit 115 designates a position in an image in a display image generator 59. Results t1 and t2 from a projection arithmetic unit 53 are delivered to the display image generator 59. The remainder of the arrangement is the same as that of the first embodiment.

In this embodiment, normalizing means are the number of projection directions of the CT scanner, the reconstruction method of the reconstruction arithmetic unit, and the power spectrum (like in the first embodiment).

The operation of the image classification apparatus with the above arrangement will be described below with reference to FIG. 22.

Figure 22:
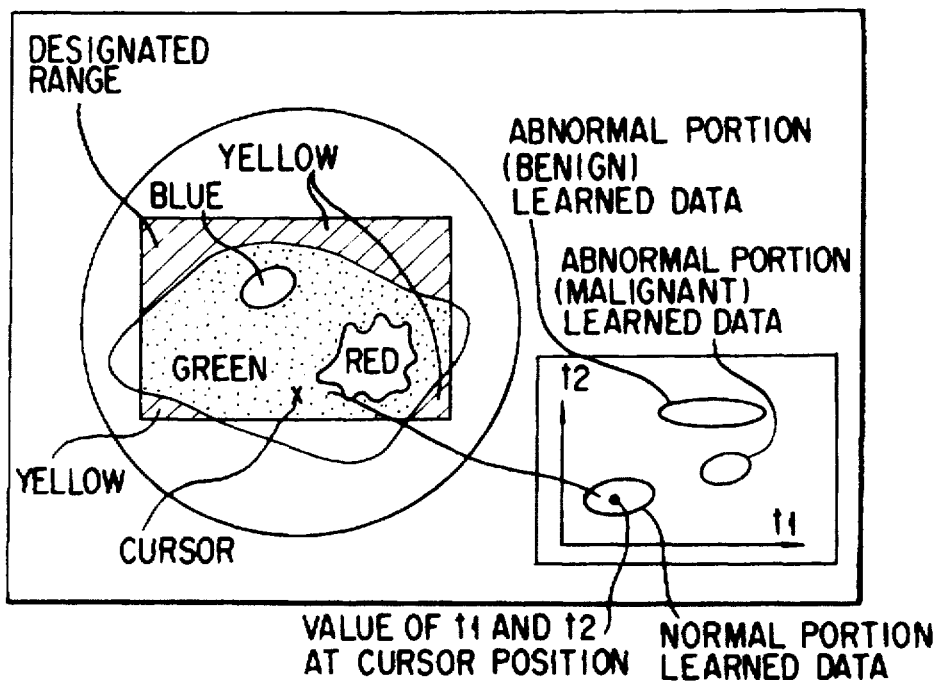
FIG. 22 is a view showing an example of an image displayed on (the screen of) a monitor.

FIG. 22 illustrates an example of an image (screen) displayed on a monitor 60. At the lower right corner of the screen, plots on a two-dimensional plane are displayed. The cursor whose position is controlled by the cursor position designating unit 115 is also displayed by mark "x". Projection arithmetic values t1 and t2 of the position of the cursor are plotted as a point which is repetitively turned on and off in the graph at the lower right corner. This graph also plots learned data (a normal portion, an abnormal portion (malignant), and an abnormal portion (benign)). Therefore, an operator can visually determine the closest region from this graph.

On the left side of the screen, determination results are displayed in colors. That is, classification determination is done within a range designated by the range designating unit, and individual regions in the range are displayed in different colors in accordance with the determination results. Note that the graph can also be formed by using the values of J1, J2, and J3, instead of t1 and t2.

Figure 24:
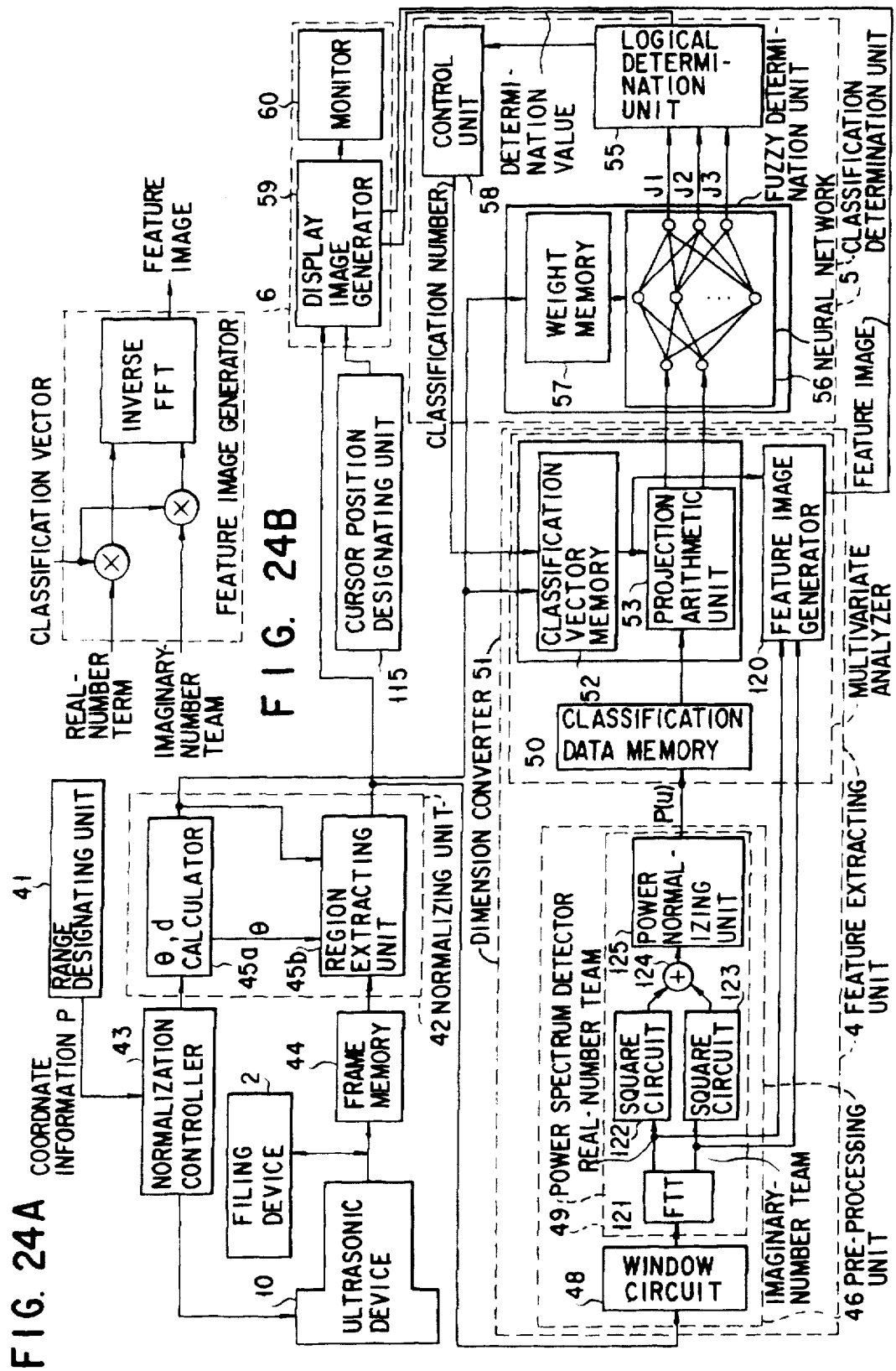
FIG. 24A is a block diagram showing the arrangement of an image classification apparatus according to the ninth embodiment.
FIG. 24B is a block diagram showing the arrangement of a feature image generator of the image classification apparatus.

FIG. 24A shows the arrangement of an image classification apparatus according to the ninth embodiment of the present invention. FIG. 24B shows the arrangement of a feature image generator of the image classification apparatus. The same reference numerals as in the first embodiment illustrated in FIG. 4 denote the same parts in FIGS. 24A and 24B, and a detailed description thereof will be omitted.

The feature image generator generates an image pertaining to a feature amount extracted by a projection arithmetic unit of a dimension converter. This image is called a feature image.

As in FIG. 24B, this feature image is obtained by multiplying the real- and imaginary-number terms of a Fourier-transformed signal by a classification vector, thereby performing inverse Fourier transformation.

The feature image thus obtained is displayed by the display image generator 59. In this case it is possible to either display the feature image alone on the monitor 60 or display the feature image in a color corresponding to the determination value in addition to the original image in a different color.

The image classification apparatus with the above arrangement can display features (density patterns) contributing to classification of images in a visually readily recognizable form. This helps support diagnoses.

A power spectrum detector 49 consists of a Fourier transformer (FFT) 121, square circuits 122 and 123 for squaring the transformed imaginary- and real-number terms, an adder 124 for adding the squared imaginary- and real-number terms, and a power normalizing unit 125. As illustrated in FIG. 10, all components are used to produce P(u).

The arrangement of an image classification apparatus according to the tenth embodiment of the present invention will be described below with reference to FIG. 25. The same reference numerals as in the first embodiment shown in FIG.

4 denote the same parts in FIG. 25, and a detailed description thereof will be omitted.

This image classification apparatus includes a general information input unit 131 for inputting general information other than image information, in addition to the arrangement of the image classification apparatus of the first embodiment.

General information supplied by the general information input unit 131 are various types of test information, e.g., a blood sugar value obtained by a blood test, a γ-GTP value, a urine glucose value and a urine protein value obtained by a urine test, and the result of an X-ray test. These pieces of information are applied to a multivariate analyzer 47 of a feature extracting unit 4 or to a fuzzy determination unit 54 or a logical determination unit 55 of a classification determination unit 5. Determinations can be performed with a higher efficiency and a higher accuracy by supplying information with a high reliability to the logical determination unit 55, information with a low reliability to the multivariate analyzer 47, and information with an intermediate reliability to the fuzzy determination unit 54. Since information other than image information are used, determinations can be accurately done even if images contain noise.

The arrangement of an image classification apparatus according to the 11th embodiment of the present invention will be described below with reference to FIG. 28. This embodiment is characterized by comprising a plurality of feature extracting units and a plurality of fuzzy determination units. An information input section of this apparatus consists of image input devices 1a to 1d such as ultrasonic devices and general information input units 150a to 150d analogous to that used in the tenth embodiment. The information from the devices 1a, 1b, 1c, and 1d and the units 150a, 150b, 150c, and 150d are input to feature extracting units 155, 156, 157, and 158, respectively.

The feature extracting units 155 to 158 have identical configurations. Each feature extracting unit has an arrangement in which an input signal from the preceding stage is output to the succeeding stage via a pre-processing unit 151 and a multivariate analyzer 153, an arrangement in which the input image is output to the succeeding stage only via a pre-processing unit 152, and an arrangement in which the input signal is output to the succeeding stage only via a multivariate analyzer 154.

Input signals from the image input device 1a and the general information input unit 150a are applied to the feature extracting unit 155. The outputs from the feature extracting unit 155 are input to a fuzzy determination unit 157. The input signals from the image input device 1a and the general information input unit 150a are also directly applied to the fuzzy determination unit 157. Input signals from the image input device 1b and the general information input unit 150b are applied to the fuzzy determination unit 157 in the same fashion as above. That is, this fuzzy determination unit 157 receives inputs from a plurality of feature extracting units, a plurality of image input devices, and a plurality of general information input units. On the other hand, a fuzzy determination unit 158 receives direct inputs from the image input device 1c and the general information input unit 150c and inputs from the feature extracting unit 157. The outputs from the fuzzy determination units 157 and 158 are applied to a logical determination unit 159. Input signals from the image input device id and the general information input unit 150d are applied to the logical determination unit 159 both directly and via the feature extracting unit 158.

As discussed above, in this embodiment all the inputs are finally applied to the logical determination unit 159, but some inputs are directly applied and some inputs are applied via the feature extracting unit, the fuzzy determination unit, or both. That is, these various inputs are used in the combined form.

With this arrangement, the accuracy of classification is improved since each input information is applied to the logical determination unit as the final stage via an optimum arithmetic operation route. As mentioned previously, high-reliability information is directly input to the logical determination unit, low-reliability information is input to the pre-processing unit or the multivariate analyzer of the feature extracting unit, and intermediate-reliability information is input to the fuzzy determination unit. This makes efficient and accurate determinations feasible. Also, if an effective feature amount is extracted in the pre-processing unit in each feature extracting unit, it is favorable to perform processing in the subsequent stage without passing the result through the multivariate analyzer, since the scale of arithmetic operations can be decreased. It is also possible to directly perform multivariate analysis for an input signal.

Although two fuzzy determination units are used in this embodiment, these fuzzy determination units are different in the contents of processing. Therefore, information can be converted into a form suitable for logical determination more easily than when a single fuzzy determination unit performs all processing. This consequently reduces the learning time.

Figure 28:
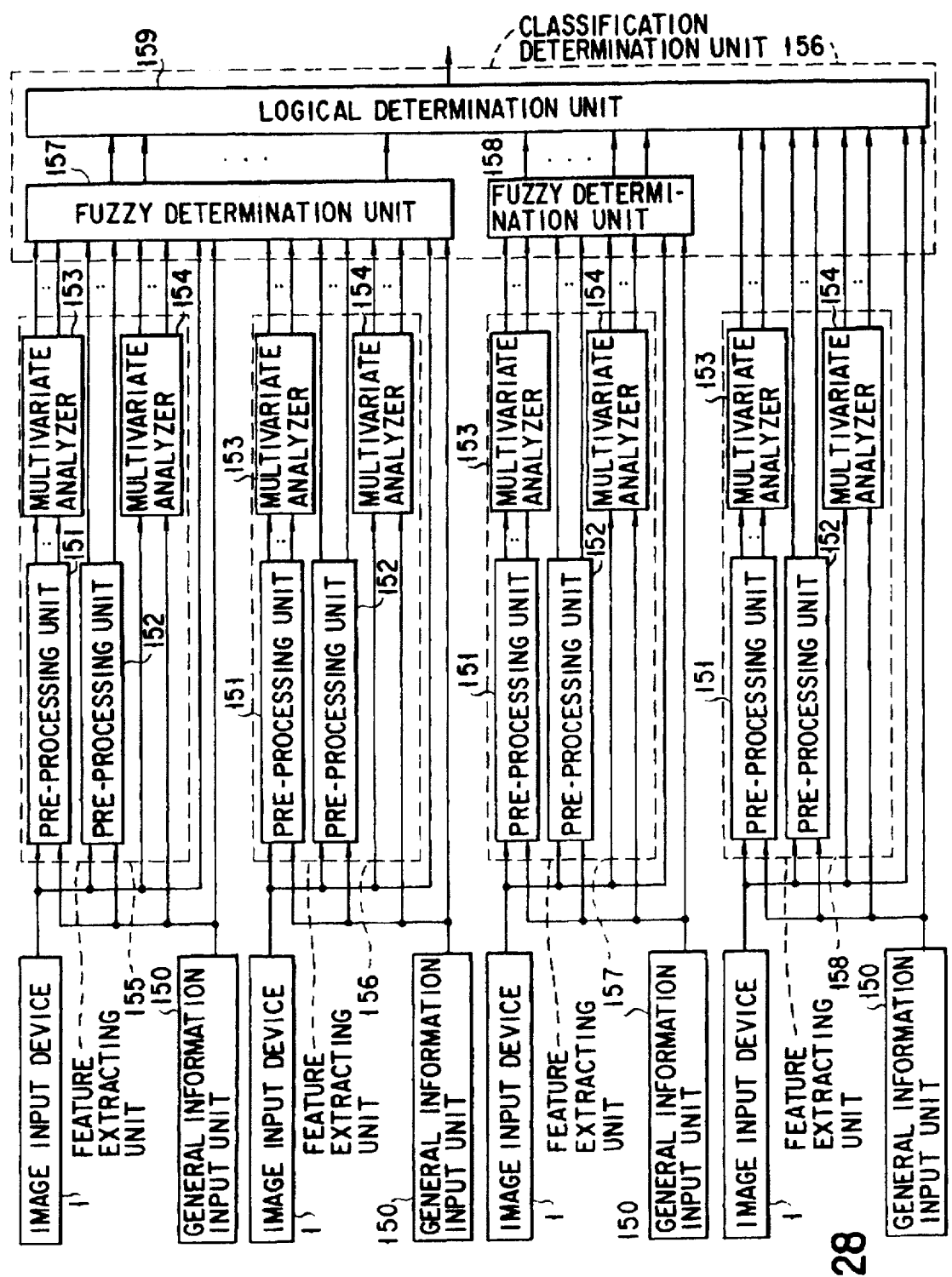
FIG. 28 is a block diagram showing the arrangement of an image classification apparatus according to the 11th embodiment.

In this embodiment, feedback control corresponding to the output from the logical determination unit and the arrangements of a normalizing unit and a display unit are not shown in FIG. 28. However, it is, of course, possible to perform feedback control, normalizing processing, and display processing similar to those in the previous embodiments.

Figure 29:
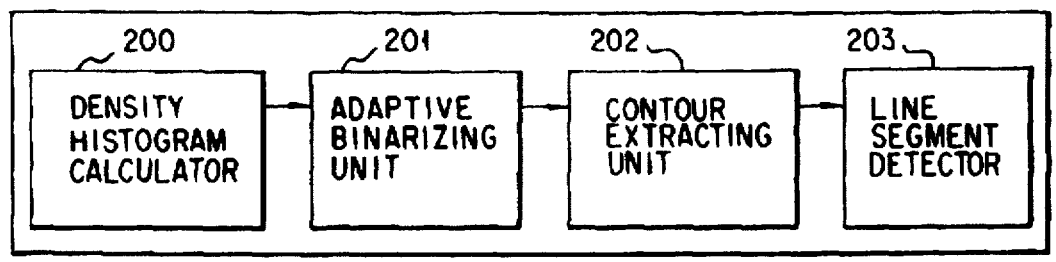
FIG. 29 is a block diagram showing an example of the arrangement of a θ,d calculator in an image classification apparatus according to the 12th embodiment.

A modification of the first embodiment will be described below as the 12th embodiment of the present invention with reference to FIG. 29. In this modification, a θ,d calculator 42 is designed as in FIG. 29.

Figure 30:
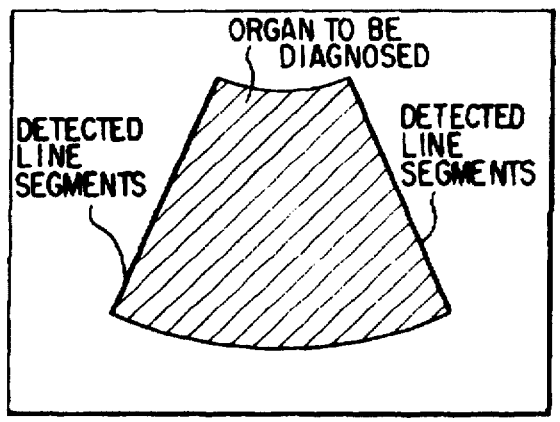
FIG. 30 is a view showing the state in which contour line extraction is performed to divide a region into an organ to be diagnosed and the other portion by using adaptive binarization.

A density histogram calculator 200 calculates a histogram pertaining to the density of an entire ultrasonic image. An adaptive binarizing unit 201 binarizes an image in accordance with the histogram calculated by the density histogram calculator 200. This binarization can also be performed by using information indicating that density values in portions other than an organ to be diagnosed are nearly 0, which is the characteristic of ultrasonic waves. As illustrated in FIG. 30, this adaptive binarization divides an image into an organ to be diagnosed and the other portion.

A contour line extracting unit 202 extracts, from the image having the divided regions, a contour line which divides the image into the diagnostic organ and the other region. A line segment detector 203 detects straight lines from the image subjected to the contour line extraction. Line segments can be easily detected by using Hough transformation, graph research, or the like well-known technique as the line segment detector. FIG. 30 also shows line segments detected.

Assuming the two line segments thus detected are $$y=ex+f$$

$$y=gx+h$$

Figure 8:
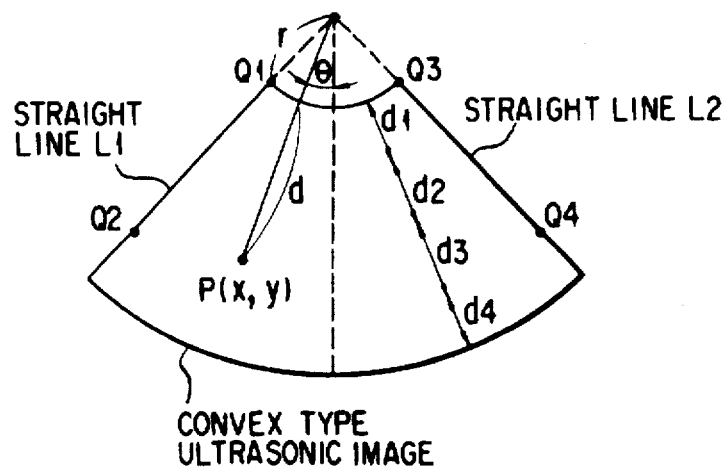
FIG. 8 is a view showing the form of an ultrasonic image obtained by the convex ultrasonic device.

Cx and Cy in FIG. 8 can be calculated by obtaining the intersection of the two lines as follows:

$$Cx=(f-h)/(g-e)$$

$Cy=(gf-eh)/(g-e)$

With this arrangement of the θ,d calculator 42, Cx and Cy can be automatically calculated even if different ultrasonic images are input, and this reduces the processing labor of an operator. Additionally, since no nonlinear arithmetic operations are necessary, the processing quantity is decreased as a whole. This permits calculations of Cx and Cy at a very high speed. The arrangement of an image classification apparatus according to the 13th embodiment of the present invention will be described below with reference to FIG. 31. This 13th embodiment is a modification of the fourth embodiment discussed earlier. The same reference numerals as in the embodiments shown in FIGS. 4 and 5 denote the same parts in the 13th embodiment in FIG. 31, and a detailed description thereof will be omitted. In this 13th embodiment, the arrangement of a pre-processing unit 46c of a feature extracting unit 4 is different from that of the pre-processing unit 46a of the fourth embodiment.

The pre-processing unit 46c consists of a differential statistic detector 210, a feature amount calculator 85a connected to the output of the differential statistic detector 210, a run-length matrix detector 211, and a feature amount calculator 85b connected to the output of the run-length matrix detector 211.

In the 13th embodiment, information of a differential statistic and a run-length matrix is used in place of the histogram, the co-occurrence matrix, and the fractal dimension used in the fourth embodiment.

A classification vector is obtained by regarding these extracted feature amounts as single multidimensional data. In addition, the output layer of a neural network 56a is constituted by five units corresponding to objects to be classified.

Calculations of the feature amounts, i.e., the differential statistic and the run-length matrix, will be briefly described below.

As the differential statistic, a probability Pδ(k) (k=0, 1, . . . , n−1) with which the density difference between two points separated by a fixed displacement δ=(r,θ) in an image of interest is k is obtained, and four types of features are calculated from this probability Pδ(k). The type of ultrasonic image is determined on the basis of these features. As with the co-occurrence matrix, the differential statistic permits extraction of fine features of an image.

The run-length matrix has as its element a frequency Pθ(i,j) (i=1, 2, . . . , n−1, j=1, 2, . . . , L) at which j points where the density is i at an angle θ succeed in an image. Five types of features are calculated from the matrix, and an ultrasonic image is characterized by using these features. Details of the differential statistic and the run-length matrix are described in "Image Analysis Handbook", Publishing Department of Tokyo University, p. 521 and p. 522, respectively, so a detailed description thereof will be omitted.

As discussed above, the use of the differential statistic and the run-length matrix reduces the calculation quantity compared to the fourth embodiment.

FIG. 32 shows another modification of the fourth embodiment. This pre-processing unit 46d comprises a differential statistic detector 210, a feature amount calculator 85a connected to the output of the differential statistic detector 210, a co-occurrence matrix detector 84, and a feature amount calculator 85b connected to the output of the co-occurrence matrix detector 84. As with the modification discussed above, this modification can also reduce the calculation amount in comparison with the fourth embodiment.

Note that it is of course possible to perform processing by choosing one of the five feature amounts (the histogram, the co-occurrence matrix, the differential statistic, the run-length matrix, and the fractal dimension) or by combining two or more of these feature amounts.

The 14th embodiment as a modification of the first embodiment will be described below with reference to FIGS. 33A, 33B, and 34. The same reference numerals as in the 13th embodiment mentioned above denote the same parts in the 14th embodiment, and a detailed description thereof will be omitted.

In performing diagnoses, medical doctors first find suspicious regions and then observe details of the suspicious regions. Therefore, this embodiment provides a method of processing a predetermined region of interest with a high accuracy.

Figure 33A:
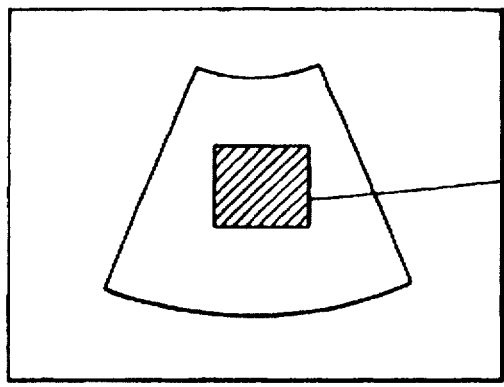
FIG. 33A is a view showing a region of interest as an object to be classified in an ultrasonic image in an image classification apparatus according to the 14th embodiment.
Figure 33B:
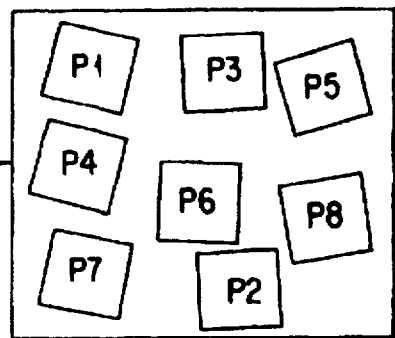
FIG. 33B is a view showing regions designated as objects to be classified.

FIG. 33A shows a region of interest to be classified in an ultrasonic image. This region of interest corresponds to a suspicious region found by a medical doctor. In this embodiment, the accuracy is improved by repetitively processing this region a plurality of number of times.

The 14th embodiment will be described in detail below with reference to FIG. 34. A range designating unit 41 inputs a range to be classified shown in FIG. 33A. This range corresponds to the region of interest discussed above. A coordinate designating unit 222 sequentially designates processing regions to be classified from this region of interest. This designation is done, e.g., in a random manner. In this embodiment, regions P1 to P8 are designated as in FIG. 33B. The classification of the processing region P1 is determined first, and the regions P2, P3, . . . , P8 are determined in sequence. The final determination is performed on the basis of the determination results of the individual processing regions. A summary of the processing of a feature amount calculating unit of this embodiment is equivalent to that of the feature calculating unit of the first embodiment, so a detailed description thereof will be omitted.

A logical determination unit 45 of a classification determination unit 5 is constituted by binarizing units 223a to 223c, cumulative adders 200a to 200c, a maximum value detector 221, and a final determination unit 224.

Outputs from a neural network are binarized by the binarizing units 223a to 223c; for example, each output is converted into 0 or 1. If a portion to be classified is a normal portion, the output from the binarizing unit 223a becomes "1", and the output from the binarizing unit 223b becomes "0". The cumulative adders 200a to 200c add these outputs.

Classification determination processing is performed for the sequentially designated regions, and the cumulative adders 220 perform cumulative additions in accordance with the outputs from the neural network. When all the regions P1 to P8 are completely processed, the maximum value detector 221 calculates the maximum value from the outputs of the cumulative adders 200a to 200c. On the basis of this maximum value, the final determination unit 224 classifies the individual regions into a normal portion, an abnormal portion (benign), or an abnormal portion (malignant).

The use of the maximum value of the results obtained by repetitively performing classification for the region of interest as discussed above makes the apparatus more resistant against noise, and this further improves the reliability of the apparatus. Note that eight processing regions are designated from a region of interest in this embodiment, but it is naturally possible to designate a larger number of processing regions. Also, in this embodiment a plurality of processing regions are designated from a region of interest. However, as in the pre-processing unit 46a, FIG. 27, it is possible to use the maximum value of the results obtained by processing using different combinations of a plurality of feature amounts.

The arrangement of an image classification apparatus according to the 15th embodiment of the present invention will be described below with reference to FIGS. 35 and 36.

This image classification apparatus is capable of buffering classification data, if necessary, in the execution mode of the image classification apparatus of the first embodiment. Therefore, the apparatus can perform relearning by addition of the buffered data.

Figure 35:
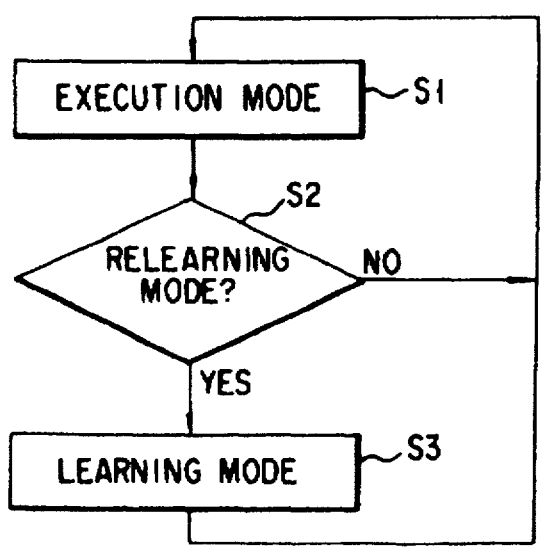
FIG. 35 is a flow chart for explaining switching between an execution mode and a learning mode in the 15th embodiment.

FIG. 35 shows the flow of basic processing. In the execution mode, an operator can perform relearning where necessary. The same reference numerals as in FIGS. 4 and 5 denote the same parts in FIG. 36, and a detailed description thereof will be omitted.

An operator designates a range to be classified by using a range designating unit 41. Within this range, a predetermined feature amount is calculated by a pre-processing unit 46 of a feature extracting unit 4. The calculated feature amount P(u) is supplied to a multivariate analyzer 47 and an additional teacher data buffer 230. The contents of processing in the multivariate analyzer and subsequent stages are equivalent to the contents shown in FIG. 4, so a detailed description thereof will be omitted. The feature amount supplied to the additional teacher data buffer 230 is managed by a buffer controller 231. Thereafter, the operator performs classification for another region. By repeating this operation, a number of feature amounts are buffered in the additional teacher data buffer 230. When the operator wishes to update classification vectors or teacher data, a processing signal is sent from the buffer controller 231 to a learning control unit 66, and the feature amounts filed in the additional teacher data buffer 230 are supplied to a teacher data input unit 62. Consequently, the classification vectors or the teacher data are updated. The classification vectors or the teacher data thus updated are stored in a classification vector memory 52 or a weight memory 57 and used in classification at a later time.

Since relearning can be performed during the execution mode as discussed above, the classification accuracy can be improved. Additionally, if the number of samples of previously learned classification vectors is small, it is possible by this function to newly form classification vectors and redo the learning. Furthermore, the data classified in the execution mode can be effectively used.

The arrangement of an image classification apparatus according to the 16th embodiment of the present invention will be described below.

This embodiment differs from the fourth embodiment discussed earlier in the method of feedback. That is, in this embodiment all combinations of two objects selected from five types of objects, i.e., a normal portion and four abnormal portions (morbid portions $\alpha$, $\beta$, $\gamma$, and $\delta$), are processed by feedback. As illustrated in FIG. 37A, classification processing for a normal portion and an abnormal portion $\alpha$ is given classification number 1. Likewise, classification for an abnormal portion $\gamma$ and an abnormal portion $\delta$ is given classification number 10. Subsequently, classification numbers 1 to 10 are executed by feedback, and a final result is determined from all of these classification results.

FIG. 37B shows the results of classifications for all combinations of two objects selected from the five different objects. The number of classification times indicates the number of times which the object of classification is classified as a normal portion or an abnormal portion (morbid portion $\alpha$, $\beta$, $\gamma$, or $\delta$). In the example shown in FIG. 37B, since the number of times the object of classification is classified as a normal portion is 4, the largest, so it is determined that this object is a normal portion. In the fourth embodiment discussed previously, classification vectors for classifying into multiple classes are used. However, this embodiment uses two classes of classification vectors. Consequently, the classification performance is very high, and the circuit scale for performing feedback can be small.

As has been discussed above, the present invention having the above embodiments can be arranged as follows and can provide various effects.

(1) The present invention provides an image classification apparatus comprising information input means for inputting information to be classified, feature extracting means for extracting feature information from the input information from the information input means, and classification determining means for determining the type of information on the basis of the feature information extracted by the feature extracting means and/or the input information from the information input means and classifying the information in accordance with the determined type.

In this arrangement, the type of information is determined on the basis of the feature information rather than by simply altering the image display method as in conventional techniques. Consequently, information can be properly classified in accordance with the feature.

(2) The present invention provides an image classification apparatus comprising information input means for inputting information to be classified, normalizing means for normalizing the input information from the information input means, feature extracting means for extracting feature information from the information normalized by the normalizing means, and classification determining means for determining the type of information on the basis of the feature information extracted by the feature extracting means and/or the input information from the information input means and classifying the information in accordance with the determined type.

In this arrangement, since the input information is normalized by the normalizing means, the difference between the input conditions of the information input means can be eliminated. This makes it possible to improve the accuracy of classification.

(3) The present invention provides an image classification apparatus comprising information input means for inputting information to be classified, feature extracting means for extracting feature information from the input information from the information input means, classification determining means for determining the type of information on the basis of the feature information extracted by the feature extracting means and/or the input information from the information input means and classifying the information in accordance with the determined type, and display means for displaying the classification determination result obtained by the classification determining means.

Since the apparatus includes the classification determination result display means, the classification determination result can be readily recognized.

(4) The present invention provides an image classification apparatus comprising information input means for inputting information to be classified, feature extracting means for extracting feature information from the input information from the information input means, classification determining means for determining the type of information on the basis of the feature information extracted by the feature extracting means and/or the input information from the information input means and classifying the information in accordance with the determined type, and learning means for constructing the feature extracting means and/or the classification determining means.

Since the apparatus includes the learning means, it is possible to construct the feature extracting means and the classification determining means in accordance with an object to be classified. This facilitates classification of various objects.

(5) The present invention provides an image classification apparatus comprising information input means for inputting information to be classified, normalizing means for normalizing the input information from the information input means, feature extracting means for extracting feature information from the information normalized by the normalizing means, classification determining means for determining the type of information on the basis of the feature information extracted by the feature extracting means and/or the input information from the information input means and classifying the information in accordance with the determined type, and display means for displaying the classification determination result obtained by the classification determining means.

Since this apparatus includes both of the normalizing means and the display means, normalized images can be displayed on the display means. That is, since the displayed image is normalized under predetermined conditions, the difference between regions to be classified can be recognized more clearly.

(6) The present invention provides an image classification apparatus comprising information input means for inputting information to be classified, normalizing means for normalizing the input information from the information input means, feature extracting means for extracting feature information from the information normalized by the normalizing means, classification determining means for determining the type of information on the basis of the feature information extracted by the feature extracting means and/or the input information from the information input means and classifying the information in accordance with the determined type, and learning means for constructing the feature extracting means and/or the classification determining means.

Since the apparatus includes the normalizing means and the learning means, learning and classification can be done under respective fixed conditions. This greatly improves the classification accuracy.

(7) The present invention provides an image classification apparatus comprising information input means for inputting information to be classified, feature extracting means for extracting feature information from the input information from the information input means, classification determining means for determining the type of information on the basis of the feature information extracted by the feature extracting means and/or the input information from the information input means and classifying the information in accordance with the determined type, display means for displaying the classification determination result obtained by the classification determining means, and learning means for constructing the feature extracting means and/or the classification determining means.

Since the apparatus includes the display means and the learning means, learning information can be displayed on the display means. Consequently, it is possible to perform learning more effectively with accurate learning information.

(8) The present invention provides an image classification apparatus comprising information input means for inputting information to be classified, normalizing means for normalizing the input information from the information input means, feature extracting means for extracting feature information from the information normalized by the normalizing means, classification determining means for determining the type of information on the basis of the feature information extracted by the feature extracting means and/or the input information from the information input means and classifying the information in accordance with the determined type, display means for displaying the classification determination result obtained by the classification determining means, and learning means for constructing the feature extracting means and/or the classification determining means.

In this arrangement, learning is performed with normalized information because the apparatus includes the normalizing means, the display means, and the learning means. Consequently, the difference in learning information between regions can be readily recognized on the display means.

(9) The present invention provides an apparatus described in one of items (1) to (8) above, wherein the information input means is at least one device selected from the group consisting of an image input device, a filing device, and a general information input device.

In this arrangement, the information input means is an image input device, so image information from various objects can be input. In addition, since the information input means is a filing device, it is possible to input digital information or database information.

Also, the information input means is a general information input device, and this makes it possible to input information effective for classification determination.

(10) The present invention provides an apparatus described in one of items (2), (5), (6), and (8) above, wherein the normalizing means includes one or a plurality of normalizing units for performing normalization in accordance with predetermined set conditions, and normalization control means for controlling the normalizing units.

In this arrangement, the classification accuracy can be improved because the normalizing means (normalizing units) can perform normalization under predetermined set conditions. Also, since the normalization control means controls the operating timings of the normalizing units, each normalizing unit can be utilized more organically. This further improves the classification determination accuracy.

(11) The present invention provides an apparatus described in one of items (2), (5), (6), and (8) above, wherein the normalizing means includes condition setting means for setting desired conditions for normalization.

In this arrangement, if optimum normalization conditions differ from one object of classification to another, the condition setting means allows desired optimum normalization. Consequently, the classification determination accuracy can be improved.

(12) The present invention provides an apparatus described in one of items (2), (5), (6), and (8) above, wherein the normalizing means outputs control information for selecting the processing of the feature extracting means and/or the processing of the classification determining means.

In this arrangement, optimum conditions of the feature extracting means and the classification determining means differ from one normalization condition to another. Therefore, the normalizing means outputs a control signal to the feature extracting means and the classification determining means, thereby selecting optimum means. This makes it possible to improve the classification determination accuracy.

(13) The present invention provides an apparatus described in one of items (1) to (8) above, wherein the feature extracting means includes multivariate analyzing means for converting input information into information suitable for classification performed by the classification determining means, and pre-processing means for calculating a feature amount prior to inputting information to the multivariate analyzing means.

In this arrangement, the pre-processing means is capable of calculating feature amounts effective for classification of information. The multivariate analyzing means converts these calculated feature amounts into feature amounts effective for classification. Consequently, the classification determination accuracy is improved.

(14) The present invention provides an apparatus described in one of items (1) to (8) above, wherein the feature extracting means includes pre-processing means for calculating a feature amount prior to directly inputting information to the classification determining means.

In this arrangement, when feature amounts effective for classification are already calculated by the preprocessing means, these feature amounts are directly applied to the classification determining means without passing through the multivariate analyzing means. This makes it possible to decrease the circuit scale and reduce the processing time.

(15) The present invention provides an apparatus described in one of items (13) and (14) above, wherein the pre-processing means includes rough pattern detecting means for extracting a feature amount of a relatively wide region from one or a plurality of image frame regions of input image information, and fine pattern detecting means for extracting a feature amount of a relatively narrow region from the image frame region or regions.

In this arrangement, information such as an image texture which is a feature amount for classification is obtained from a relatively narrow region of an image, and information such as an image contour line is obtained from a relatively wide region. The use of the feature amounts detected from these different regions leads to an improved classification determination accuracy.

(16) The present invention provides an apparatus described in one of items (1) to (8) above, wherein the classification determining means includes fuzzy determining means for converting information as an object to be classified into a form suitable for logical determination, logical determining means for logically determining the output from the fuzzy determining means and/or the information as an object to be classified, and feedback means for selecting, on the basis of the output from the logical determining means, the processing of the feedback means or the processing of a preceding stage of the logical determining means.

In this arrangement, the fuzzy determining means can perform intuitive determination such as performed in the right-half brain of a human, and the logical determining means can perform logical determination such as performed in the left-half brain of a human. Also, the feedback means can perform repetitive processing similar to repetitive thinking of a human. With these three actions, it is possible to perform processing analogous to human determination, and this permits classification determination with a higher accuracy.

(17) The present invention provides an apparatus described in one of items (1) to (8) above, wherein the classification determining means includes logical determining means for logically determining information as an object to be classified, and feedback means for selecting, on the basis of the output from the logical determining means, the processing of the feedback means or the processing of a preceding stage of the logical determining means.

In this arrangement, if input information is more distinct with respect to an object of classification, the fuzzy determining means described in item (16) above can be omitted. Consequently, the circuit scale can be decreased, and the processing time shortened.

(18) The present invention provides an apparatus described in one of items (1) to (8) above, wherein the classification determining means includes fuzzy determining means for converting information as an object to be classified into a form suitable for logical determination, and logical determining means for logically determining the output from the fuzzy determining means and/or the information as an object to be classified.

In this arrangement, when classification can be well performed by the fuzzy determining means and the logical determining means, the feedback means can be omitted. Consequently, it is possible to decrease the circuit scale and shorten the processing time.

(19) The present invention provides an apparatus described in one of items (1) to (8) above, wherein the classification determining means includes fuzzy determining means for converting information as an object to be classified into a form suitable for logical determination.

In this arrangement, when classification can be well performed by the fuzzy determining means alone, the logical determining means and the feedback means can be omitted. Consequently, it is possible to decrease the circuit scale and shorten the processing time.

(20) The present invention provides an apparatus described in one of items (1) to (8) above, wherein the classification determining means includes logical determining means for logically determining information as an object to be classified.

In this arrangement, when classification can be well performed by the logical determining means alone, the fuzzy determining means and the feedback means can be omitted. Consequently, it is possible to decrease the circuit scale and shorten the processing time.

(21) The present invention provides an apparatus described in one of items (3), (5), (7), and (8) above, wherein the display means includes display image generating means for displaying image information from the information input means and information concerning the feature amount extracted by the feature extracting means and/or information concerning the determination result obtained by the classification determining means.

Since the image information and the feature amount or the classification determination result are displayed, the determination result can be recognized more easily.

(22) The present invention provides an apparatus described in item (21) above, wherein the display image generating means displays an image in a visually specific form in accordance with the feature amount extracted by the feature extracting means or the determination result obtained by the classification determining means.

Since an image is displayed in a visually specific form in accordance with the determination result, the determination result can be visually recognized more accurately, more rapidly, and more easily.

(23) The present invention provides an apparatus described in item (22) above, wherein in displaying the image in a visually specific form, the image is displayed in a particular color in accordance with the feature amount or the determination result.

Since an image is displayed in a particular color according to the determination result, the determination result can be recognized more accurately, more rapidly, and more easily.

(24) The present invention provides an apparatus described in item (22) above, wherein in displaying the image in a visually specific form, the image is displayed in the form of a graph in accordance with the feature amount or the determination result.

Since an image is displayed in the form of a graph according to the feature amount or the determination result, the determination result can be recognized more accurately, more rapidly, and more easily.

(25) The present invention provides an apparatus described in one of items (4), (6), (7), and (8) above, wherein the learning means includes teacher data input means for inputting data required to perform learning, classification vector calculating means for performing calculations for setting various conditions in the feature amount extracting means on the basis of the information from the teacher data input means, and learning control means for controlling the teacher data input means and the classification vector calculating means.

Since the apparatus includes the teacher data input means, the teacher information can be rapidly and accurately input. In addition, the learning means includes the classification vector calculating means, so time-consuming calculations need be performed only during learning. This increases the speed of classification determination. Also, the learning control means for controlling these two means makes more efficient learning feasible.

(26) The present invention provides an apparatus described in item (25) above, wherein the learning control means performs control for displaying the teacher data on a monitor for displaying image information.

In this arrangement, the teacher information can be input more rapidly and accurately because it is displayed on the display means.

(27) The present invention provides an apparatus described in item (25) above, wherein the classification vector calculating means calculates a classification vector by using a statistical method.

Consequently, a classification vector which is highly resistant against noise can be calculated with a high accuracy by the statistical method.

(28) The present invention provides an apparatus described in item (25), wherein the learning control means outputs control information for selecting the processing of the feature extracting means and/or the processing of the classification determining means.

Consequently, the processing of the feature extracting means and the classification determining means can be chosen for each learning condition. This permits higher-level classification determination.

(29) The fuzzy determining means provided in the classification determining means consists of a weight memory which stores data subjected to predetermined learning, and a neural network which is weighted on the basis of the data stored in the weight memory. The neural network can be readily subjected to learning. Consequently, various types of teacher information can be incorporated into the classification apparatus, and this improves the accuracy of classification determination.

(30) The feature extracting means includes a preprocessing unit and a multivariate analyzer. The preprocessing unit has contour line extracting means for extracting contour line information from an input image. As a consequence, a structural feature can also be used in classification determination.

(31) The multivariate analyzer has a classification vector memory which stores data required to classify feature information. Therefore, extracted information can be used any number of times by feedback control.

(32) On the basis of information from a logical determining unit provided in the classification determining means, the information stored in the weight memory and the information stored in the classification vector memory are selectively read out. This makes more effective use of the information possible, improving the accuracy of classification determination.

(33) The feature information extracted by the feature extracting means is information of at least one of a power spectrum, a histogram, a co-occurrence matrix, a fractal dimension, and a contour line. With the use of this information, complicated determination can be performed easily and accurately.

(34) In the image classification apparatus of the present invention, an X-ray image input device, a CT (X-ray, NMR) apparatus, or an ultrasonic device can be used as the image input device for inputting image signals. When the ultrasonic device is used, there is provided correcting means for correcting a received ultrasonic signal according to the characteristics of an ultrasonic oscillator. Since this correcting means corrects variations in the performance of individual ultrasonic oscillators, the accuracy of classification determination can be improved.

(35) The image classification apparatus of the present invention comprises feature extracting means for extracting a feature of an input image signal, classification determining means for determining the type of the image signal on the basis of the extracted feature information and classifying the image in accordance with the determined type, and learning control means for constructing the feature extracting means and the classification determining means. The classification determining means consists of fuzzy determining means, logical determining means for determining classification of the feature information on the basis of the output from the fuzzy determining means, and learning means for constructing the feature extracting means and the classification determining means. Since a feature is extracted from each predetermined region, an arbitrary classification determination region can be selected. In addition, since classification determination is done in two steps, more complicated classification determination can be performed.

(36) The feature extracting means sets a region extraction window in accordance with the image extraction position. Consequently, it is possible to correct the inherent photographing characteristics of a convex type ultrasonic device, which vary with position (because a time difference is produced between received signals according to the arrangement of ultrasonic oscillators).

(37) Write and read addresses for the values of the classification vector memory for feature extraction and of the weight memory of the classification determining means are set in accordance with the image extraction position. That is, the measurement distance of the ultrasonic device whose imaging band varies with that distance is divided into several steps, and the values of the classification vector memory and the weight memory are set for each of these steps. Consequently, the accuracy of classification determination can be improved.

(38) The display means displays an image while changing the color and the density according to the classification of the image determined by the classification determining means. That is, the display means displays an image in a predetermined color while preserving the luminance information of the image. Therefore, the correspondence between the structure and the classification is readily understandable.

(39) The present invention provides an image classification apparatus comprising information input means for inputting information to be classified, feature extracting means, having a function of dividing an area into an effective area and an ineffective area from the information input from the input means, and classification determining means for determining the type of information on the basis of the feature information extracted by the feature extracting means and/or the information input from the information input means and classifying the information in accordance with the determined type.

With this arrangement, since the effective area can be automatically extracted, processing by the operator can be reduced, and processing efficiency can be improved.

(40) The present invention provides an image classification apparatus comprising information input means for inputting information to be classified, feature extracting means for extracting feature information using at least one of a differential statistic and a run-length matrix selected from a power spectrum, the differential statistic, a co-occurrence matrix, and the run-length matrix, all of which are derived from the information input from the information input means, and classification determining means for determining the type of information on the basis of the feature information extracted by the feature extracting means and/or the information input from the information input means and classifying the information in accordance with the determined type.

With this arrangement, since image features can be finely extracted, the precision of classification determination can be improved.

(41) The present invention provides an image classification apparatus comprising information input means for inputting information to be classified, feature extracting means for extracting feature information from the information input from the information input means, and classification determining means for classifying and determining a specific area a plurality of times using the feature information extracted by the feature extracting means.

With this arrangement, since the image classification apparatus has a robust arrangement against noise, reliability of the classification determination can be improved.

(42) The present invention provides an image classification apparatus comprising information input means for inputting information to be classified, feature extracting means for extracting feature information from the information input from the information input means, classification determining means for determining the type of information on the basis of the feature information extracted by the feature extracting means and/or the information input from the information input means and classifying the information on the basis of the determined type, and learning means for reconstructing the feature extracting means and/or the classification determining means using a classification result from the classification determining means.

With this arrangement, the precision of classification determination can be improved, and further the classified and determined data can be effectively utilized.

The present invention has been described by taking an image classification apparatus for supporting a diagnosis for a morbid portion of a tumor as the embodiments. However, the invention is not limited to these specific embodiments. That is, image classification can be similarly performed for image data that can be input by the image input device described in these embodiments. Therefore, it is, of course, possible to make various modifications and applications without departing from the spirit and scope of the invention.

According to the present invention as has been discussed in detail above, there can be provided an image classification apparatus capable of accurately classifying even a portion of an input image which is difficult to extract by binarization or three-dimensional display alone, and displaying the classified portion in a visually readily recognizable form.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An image classification apparatus comprising:

an information input device for inputting information to be classified;

feature extracting means for extracting feature information from the input information; and classification determining means for determining a type of the input information on the basis of at least the feature information extracted by said feature extracting means, and for classifying the input information in accordance with the determined type;

said feature extracting means including:

multivariate analyzing means for converting the input information into information suitable for classification performed by said classification determining means;

differential statistic detecting means for calculating a feature of the input information by obtaining a probability $P\delta(k)$ ($k=0, 1, \ldots, n-1$) with which a density difference between two points separated by a fixed displacement $\delta=(r,e)$ in an image frame region of interest in at least one image frame of the input information is k, and for determining a type of an object in the at least one image frame region in accordance with the calculated feature;

run-length matrix detecting means for producing a run-length matrix which characterizes the object in the at least one image frame region and which has as elements frequencies $P\theta(i,j)$ ($i=1, 2, \ldots, n-1, j=1, 2, \ldots, L$) at which points having a density corresponding to an angle $\theta$ succeed in the at least one image frame region, said run-length matrix detecting means calculating a feature amount from the run-length matrix and representing a specific speckle pattern using the calculated feature amount; and pre-processing means for causing the feature amount to be calculated prior to providing the input information to said multivariate analyzing means.

2. An image classification apparatus comprising:

an information input device for inputting information to be classified;

feature extracting means for extracting feature information from the input information;

classification determining means for determining a type of the input information on the basis of at least the feature information extracted by said feature extracting means, and for classifying the input information in accordance with the determined type; and learning means for constructing at least one of said feature extracting means and said classification determining means;

said feature extracting means including multivariate analyzing means for converting the input information into information suitable for classification performed by said classification determining means, and pre-processing means for calculating a feature amount prior to providing the input information to said multivariate analyzing means, and said learning means including:
- a teaching data input device for enabling teaching data required to perform learning to be input,
- classification vector calculating means for performing calculations for setting various conditions in said feature amount extracting means on the basis of the input teaching data, and
- learning control means for controlling operation of said teaching data input device and said classification vector calculating means.

3. The image classification apparatus according to claim 2, further comprising at least one of:
- normalizing means for normalizing the input information; and
- display means for displaying the type of the input information determined by said classification determining means.

4. The image classification apparatus according to claim 2, wherein said information input device comprises at least one of an image input device, a filing device, and a general information input device.

5. The image classification apparatus according to claim 3, wherein said normalizing means includes at least one normalizing unit for performing normalization in accordance with predetermined set conditions, and normalization control means for controlling said at least one normalization unit.

6. The image classification apparatus according to claim 3, wherein said normalizing means includes setting means for setting desired conditions for normalization.

7. The image classification apparatus according to claim 3, wherein said normalizing means includes means for outputting control information for selecting a processing operation of at least one of said feature extracting means and said classification determining means.

8. The image classification apparatus according to claim 2, wherein said pre-processing means includes rough pattern detecting means for extracting, from at least one image frame region of the input information, a feature amount of a first region larger than said at least one image frame region, and fine pattern detecting means for extracting, from said at least one image frame region, a feature amount of a second region smaller than said first region.

9. The image classification apparatus according to claim 2, wherein said classification determining means comprises at least one of:
- fuzzy determining means for converting the input information into a form suitable for logical determination;
- logical determining means for logically determining one of an output from said fuzzy determining means and the input information; and
- feedback means for selecting, on the basis of an output from said logical determining means, one of a processing operation of said feedback means and a preceding processing operation of said logical determining means.

10. The image classification apparatus according to claim 3, wherein said display means includes display image generating means for displaying an image of the input information, and one of information relating to the feature information extracted by said feature extracting means and information relating to the type of the input information determined by said classification determining means.

11. The image classification apparatus according to claim 10, wherein said display image generating means displays the image in a predetermined visual form in accordance with one of the feature information extracted by said feature extracting means and the type of the input information determined by said classification determining means.

12. The image classification apparatus according to claim 11, wherein said display image generating means displays the image in a particular color in accordance with one of the feature information extracted by said feature extracting means and the type of the input information determined by said classification determining means.

13. The image classification apparatus according to claim 11, wherein said display image generating means displays the image in graphical form in accordance with one of the feature information extracted by said feature extracting means and the type of the input information determined by said classification determining means.

14. The image classification apparatus according to claim 2, wherein said learning control means includes means for controlling a display operation of said input teaching data on a monitor for displaying images of the input information.

15. The image classification apparatus according to claim 2, wherein said classification vector calculating means includes means for calculating a classification vector using a statistical method.

16. The image classification apparatus according to claim 2, wherein said learning control means includes means for outputting control information for selecting a processing operation of at least one of said feature extracting means and said classification determining means.

17. The image classification apparatus according to claim 3, wherein said normalizing means comprises:
- density histogram calculating means for calculating a histogram pertaining to a density of an entire image of the input information;
- binarizing means for binarizing said entire image in accordance with said calculated histogram and for dividing said entire image into regions on the basis of a numerical value obtained from said binarizing;
- contour line extracting means for extracting a contour line of an object from each of the regions divided by said binarizing means; and
- line segment detecting means for detecting a straight-line component of the object extracted by the contour line extracting means.

18. An image classification apparatus according to claim 2, wherein:
- said information input device includes coordinate designating means for sequentially designating processing regions to be classified from a region of interest of an image of the input information; and
- said classification determining means includes:
  - fuzzy determining means having a neural network for converting the input information into a form suitable for logical determination; and
  - logical determining means comprising binarizing means for binarizing a plurality of outputs from said neural network of said fuzzy determining means, cumulative adding means for cumulatively adding binarization results, maximum value detecting means for calculating a maximum value of the cumulatively added binarization results in all of the processing regions designated by said coordinate designating means, and final determining means for classifying the region of interest in accordance with the calculated maximum value.

19. The image classification apparatus according to claim 2, wherein:

said learning means includes:

additional teaching data buffer means for sequentially generating and storing additional teaching data corresponding to feature amounts of information supplied from said feature extracting means; and buffer control means for inputting new teaching data to said teaching data input device based on the feature amounts, said new teaching data being stored in said additional teaching data buffer means; and said classification vector calculating means performs said calculations on the basis of said teaching data and said additional teaching data.

20. An image classification apparatus comprising;

an information input device for inputting information to be classified;

normalizing means for normalizing the input information;

feature extracting means for extracting feature information from the input information; and classification determining means for determining a type of the input information on the basis of at least the feature information extracted by said feature extracting means, and for classifying the input information in accordance with the determined type;

said feature extracting means including multivariate analyzing means for converting the input information into information suitable for classification performed by said classification determining means, and preprocessing means for calculating a feature amount prior to providing the input information to said multivariate analyzing means; and said normalizing means including:

density histogram calculating means for calculating a histogram pertaining to a density of an entire image of the input information, binarizing means for binarizing said entire image in accordance with said calculated histogram and for dividing said entire image into regions on the basis of a numerical value obtained from said binarizing, contour line extracting means for extracting a contour line of an object from each of the regions divided by said binarizing means, and line segment detecting means for detecting a straight-line component of the object extracted by the contour line extracting means.

\* \* \* \* \*